United States Patent
Doan et al.

(10) Patent No.: US 9,946,432 B2
(45) Date of Patent: Apr. 17, 2018

(54) CUSTOMIZABLE BLADED APPLICATIONS

(71) Applicant: Microsoft Technology Licensing, LLC, Redmond, WA (US)

(72) Inventors: Christopher Doan, Seattle, WA (US); Miron Vranjes, Seattle, WA (US); Chaitanya Dev Sareen, Seattle, WA (US); Lavanya Vasudevan, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 535 days.

(21) Appl. No.: 14/589,609

(22) Filed: Jan. 5, 2015

(65) Prior Publication Data
US 2016/0196006 A1    Jul. 7, 2016

(51) Int. Cl.
*G06F 3/0481*    (2013.01)
*G06F 3/0482*    (2013.01)
(Continued)

(52) U.S. Cl.
CPC .......... *G06F 3/0481* (2013.01); *G06F 3/0482* (2013.01); *G06F 3/0485* (2013.01);
(Continued)

(58) Field of Classification Search
CPC .................................................... G06F 3/0481
(Continued)

(56) References Cited

U.S. PATENT DOCUMENTS 5,712,995 A * 1/1998 Cohn .................... G06F 3/0481
715/792
5,754,178 A * 5/1998 Johnston, Jr. ......... G06F 3/0486
715/769
(Continued)

FOREIGN PATENT DOCUMENTS

EP        2618246        7/2013
WO        WO-9921084     4/1999
(Continued)

OTHER PUBLICATIONS

Vogel, "Windows 8: snap multi-tasking explained", PC Advisor, Retrieved from <http://www.pcadvisor.co.uk/features/windows/3361314/windows-8-snap-multi-tasking/> on Oct. 13, 2014, May 31, 2012, 9 pages.*

(Continued)

*Primary Examiner* — Reza Nabi

(57) ABSTRACT

Customizable bladed applications are described herein. A device platform is configured to provide a simultask mode that enables combined user access to multiple applications of the platform via respective chrome portions. When simultask mode is active, arrangement of chrome elements within a user interface is controlled to generate a bladed view that provides a compact representation for one application in conjunction with an expanded view that provides principal chrome for a different application. The platform makes the bladed view available for any displayable application of the platform. The bladed view may also include application-specific elements that are populated using customizations (Continued)

designated via metadata of the application, or using default information for applications in the absence of designated customizations. Further, the platform may implement a notification system that operates on behalf of applications to obtain and apply updates for dynamically updatable content incorporated into bladed views.

20 Claims, 13 Drawing Sheets

(51) Int. Cl.
*G06F 3/0488* (2013.01)
*G06F 9/44* (2018.01)
*G06F 3/0485* (2013.01)

(52) U.S. Cl.
CPC ........ *G06F 3/0488* (2013.01); *G06F 3/04886* (2013.01); *G06F 9/4443* (2013.01)

(58) Field of Classification Search
USPC ........................................................ 715/779
See application file for complete search history.

(56) References Cited

U.S. PATENT DOCUMENTS

| | | | | | |
|---|---|---|---|---|---|
| 5,889,517 | A * | 3/1999 | Ueda | ................. | G09G 5/14 715/803 |
| 6,046,739 | A * | 4/2000 | MacPhail | .............. | G06F 3/0481 715/767 |
| 7,370,284 | B2 * | 5/2008 | Andrea | ................. | G06F 3/0481 715/788 |
| 8,290,943 | B2 * | 10/2012 | Carbone | ............. | G06F 17/3087 707/724 |
| 9,207,092 | B1 * | 12/2015 | Yamasaki | .......... | G01C 21/3632 |
| 9,654,556 | B2 * | 5/2017 | Chan | .................. | H04L 67/1095 |
| 2004/0068458 | A1 * | 4/2004 | Russo | .................... | G06Q 40/04 705/36 R |
| 2006/0265726 | A1 * | 11/2006 | Byun | ..................... | H04H 40/18 725/40 |
| 2009/0249247 | A1 * | 10/2009 | Tseng | ................ | H04M 1/72552 715/808 |
| 2009/0288036 | A1 * | 11/2009 | Osawa | .................. | G06F 9/4443 715/794 |
| 2010/0262901 | A1 * | 10/2010 | DiSalvo | ................. | G06Q 40/04 715/227 |
| 2012/0304106 | A1 * | 11/2012 | LeVee | .................. | G06F 3/0481 715/781 |
| 2012/0323679 | A1 * | 12/2012 | Yang | ................. | G06Q 30/0241 705/14.49 |
| 2013/0290982 | A1 * | 10/2013 | Beilis | ................... | G06F 3/0481 719/313 |
| 2013/0303267 | A1 * | 11/2013 | Vasquez | ................. | H04L 63/08 463/25 |
| 2013/0305158 | A1 * | 11/2013 | Vasquez | ................ | G06F 3/0481 715/733 |
| 2014/0068494 | A1 * | 3/2014 | Petersen | ............. | H04M 1/7253 715/778 |
| 2014/0075394 | A1 * | 3/2014 | Nawle | ............... | H04M 1/72519 715/863 |
| 2014/0245203 | A1 * | 8/2014 | Lee | ...................... | G06F 3/04817 715/765 |
| 2016/0192161 | A1 * | 6/2016 | Lynn | ....................... | H04W 4/14 455/414.3 |
| 2016/0196006 | A1 * | 7/2016 | Doan | .................... | G06F 3/0481 715/779 |

FOREIGN PATENT DOCUMENTS

| | | | | |
|---|---|---|---|---|
| WO | 2014165976 | A1 | 10/2014 | |
| WO | WO2014165976 | * | 10/2014 | ............... G06F 3/14 |

OTHER PUBLICATIONS

Benjamin, "'CallBar' Sets the Bar When it Comes to Managing Incoming Calls", Retrieved from <http://www.idownloadblog.com/2011/07/18/callbar/> on Oct. 13, 2014, Jul. 18, 2011, 4 pages.*
"International Preliminary Report on Patentability Issued in PCT Application No. PCT/US2015/067751", dated Feb. 10, 2017, 8 Pages.
"Second Written Opinion", Application No. PCT/US2015/067751, dated Nov. 15, 2016, 6 pages.
"International Search Report and Written Opinion Issued in PCT Application No. PCT/US2015/067751", dated Apr. 15, 2016, 13 Pages.
"Enhanced Multi-Tasking on the Samsung Galaxy Note 3", Retrieved from <http://www.gizmodo.co.uk/2013/11/enhanced-multi-tasking-on-the-samsung-galaxy-note-3/> on Oct. 13, 2014, Nov. 18, 2013, 11 pages.
"Use more than one app at a time", Retrieved from <http://www.microsoft.com/surface/en-us/support/apps-and-windows-store/use-two-apps-at-the-same-time> Oct. 1, 2014, Nov. 5, 2013, 3 pages.
Hoffman, "How to Run Two Windows 8 Apps at the Same Time With the Snap Feature", Retrieved from <http://www.howtogeek.com/127756/how-to-run-two-windows-8-apps-at-the-same-time-with-the-snap-feature/> on Oct. 13, 2014, Nov. 1, 2012, 5 pages.
Smith, "How to Use Samsung Multi Window Mode on the Galaxy Note 3", Retrieved from <http://blog.laptopmag.com/how-to-use-samsung-multi-window-mode> on Oct. 13, 2014, Oct. 3, 2013, 11 pages.
Sutrich, "How-To: Samsung Galaxy Note 3 Multi-View", Retrieved from <http://www.androidheadlines.com/2013/10/samsung-galaxy-note-3-multi-view.html> on Oct. 13, 2014, Oct. 8, 2013, 15 pages.
Vogel, "Windows 8: snap multi-tasking explained", PC Advisor, Retrieved from <http://www.pcadvisor.co.uk/features/windows/3361314/windows-8-snap-multi-tasking/> on Oct. 13, 2014, May 31, 2012, 4 pages.

* cited by examiner

CUSTOMIZABLE BLADED APPLICATIONS

BACKGROUND

Computing devices have been developed to increase the settings in which computing functionality is made available to users. For instance, mobile phones and slate form factor devices (e.g., tablets) have advanced to provide access to content, applications, services, browsing, and other computing functionality in mobile settings. Additionally, availability and use of various kinds of wearable computing devices (e.g., watches, fitness bands, pod devices, glasses, etc.) is steadily increasing.

Due to the small size of mobile devices and wearable devices (e.g., mobile platforms), and correspondingly limited screen-real estate, it may be challenging to implement schemes for controlling positioning of on-screen elements and user interfaces for the devices. For instance, traditional mobile device operating systems are configured to provide access to a single application user experience at a time that consumes available screen-real estate, which prevents or limits users' ability to access and/or combine functionality associated with multiple applications. Interaction with multiple applications (e.g., multitasking or simultasking) may require a user to perform a series of tasks to activate, launch, locate, and/or switch back and forth between each application. Consequently, using conventional techniques for multi-tasking on a mobile device or other computing platform may lead to user frustration and may be inadequate in some scenarios.

SUMMARY

Techniques and apparatuses for customizable bladed applications are described herein. In one or more implementations, an operating system for a platform is configured to provide a simultask mode that enables combined user access to multiple applications of the platform via respective chrome portions for the multiple applications. When simultask mode is active, arrangement of chrome elements within a user interface is controlled to generate a bladed view that provides a compact application representation for one application in conjunction with an expanded view that provides principal chrome for a different application. The expanded view consumes at least a majority of available screen real-estate and the bladed view may be configured as a bar element that overlays or adjoins the expanded view.

The platform is configured to make the bladed view available for any displayable application of the platform. The bladed view may also include application-specific elements that are populated using customizations designated via metadata of the application, or using default information for applications in the absence of designated customizations. Further, the platform may implement a notification system that operates on behalf of applications to obtain and apply updates for content streams and other dynamically updatable content elements that are incorporated into bladed views of applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Figure 1:
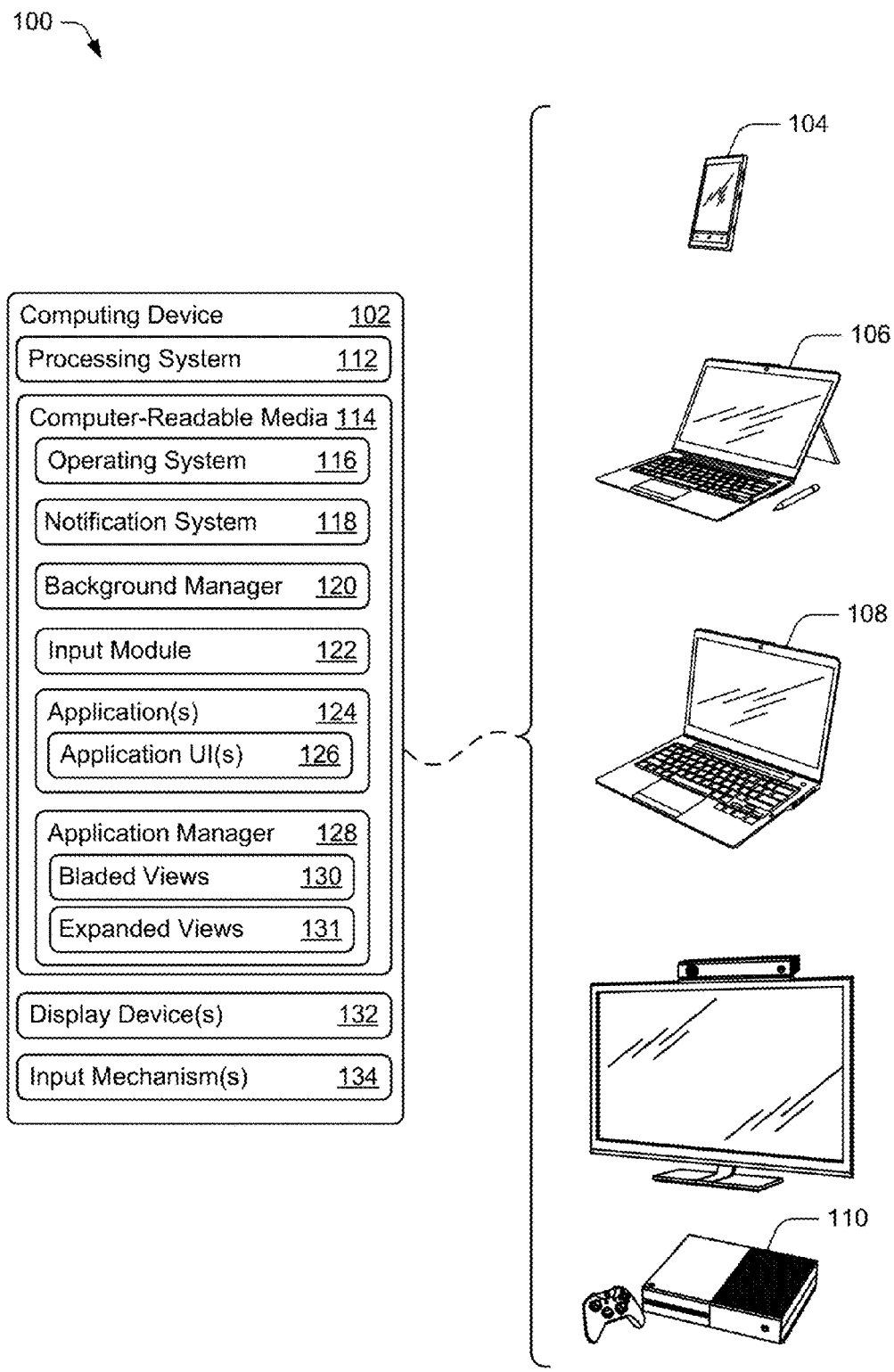
FIG. 1 is an illustration of an environment in an example implementation that is operable to employ techniques for customizable bladed applications described herein.

Traditionally, mobile device operating systems are configured to provide access to a single application user experience at a time that consumes available screen-real estate. Interaction with multiple applications may require a user to perform a series of tasks to locate, activate, launch, and/or switch back and forth between each application, which prevents or limits users' ability to multitask or simultask. Consequently, using conventional techniques for multi-tasking on some computing platforms may lead to user frustration and may be inadequate in some scenarios.

Techniques and apparatuses for customizable bladed applications are described herein. In one or more implementations, an operating system for a platform is configured to provide a simultask mode that enables combined user access to multiple applications of the platform via respective chrome portions for the multiple applications. When simultask mode is active, arrangement of chrome elements within a user interface is controlled to generate a bladed view that provides a compact application representation for one application in conjunction with an expanded view that provides principal chrome for a different application. The expanded view consumes at least a majority of available screen real-estate and the bladed view may be configured as a bar element that overlays or adjoins the expanded view.

The platform is configured to make the bladed view available for any displayable application of the platform. The bladed view may also include application-specific elements that are populated using customizations designated via metadata of the application, or using default information for applications in the absence of designated customizations. Further, the platform may implement a notification system that operates on behalf of applications to obtain and apply updates for content streams and other dynamically updatable content elements that are incorporated into bladed views of applications.

Customizable bladed applications as described in this document make user interaction with multiple applications more convenient and efficient. For instance, the bladed view may be presented in a consistent, fixed location (or locations) within a device user interface, which enables users to quickly recognize and use the bladed view for multi-application interaction scenarios. Accordingly, access to and interaction with multiple applications may occur using fewer steps and take less time using the bladed views. The platform is also configured to support the bladed view for any application using default information for applications (e.g., name, icon, color scheme, etc.), which increases value and convenience for application developers since the developers do not have to perform additional work to enable the bladed view for their applications. Application developers may also take advantage of customizable aspects of the bladed view to designate application-specific customization, which can increase user satisfaction with both the application and developer. Moreover, users can launch the simultask mode on-demand, select particular applications to show in the various views (e.g., bladed and expanded), and switch back and forth between applications quickly, which makes efficient use of limited screen-real estate to selectively surface information of interest to individual users and enable enhanced interaction scenarios.

In the following discussion, an example environment is first described that may employ the techniques described herein. Example details and procedures are then described which may be implemented in the example environment as well as other environments. Consequently, the example details and procedures are not limited to the example environment and the example environment is not limited to the example details and procedures. Lastly, an example system and components of the system are discussed that may be employed to implement aspects of the techniques described herein.

Example Environment

FIG. 1 is an illustration of an environment 100 in an example implementation that is operable to employ techniques described herein. The illustrated environment 100 includes a computing device 102 that may be configured in a variety of ways. For example, a computing device may be configured as a mobile phone device 104, a tablet computing device 106, a laptop computer 108, and a gaming device 110 as illustrated in FIG. 1. Other computing devices and systems are also contemplated, such as set-top boxes, servers, and netbooks, and so forth. The computing device may range from full resource devices with substantial memory and processor resources (e.g., personal computers, game consoles, tablets) to a low-resource device with limited memory and/or processing resources (e.g., traditional set-top boxes, hand-held game consoles, mobile phones). Additionally, although a single computing device is shown in some instances, the computing device may be representative of a plurality of different devices. Further examples of computing systems and devices suitable to implement techniques described herein are described below in relation to FIG. 13.

In the illustrated example, the computing device 102 includes a processing system 112 having one or more processing devices and computer-readable media 114 configured to implement various application programs, modules, logic, and/or device functionality. For instance, the computer-readable media 114 may include an operating system 116, notification system 118, background manager 120, input module 122, application(s) 124, each having one or more application user interfaces 126 (application UI(s) 126), and an application manager 128 operable to control arrangement of application UIs 126 to selectively generate and switch between bladed views 130 and expanded views 131 for the applications as described above and below.

The computing device 102 additionally may include or otherwise make use of one or more display devices 132 and input mechanisms 134. Display devices 132 may be separate or integrated with the computing device 102. Input mechanisms 134 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. Input mechanisms 134 may be separate or integrated with displays device 132. Integrated examples may include gesture-sensitive displays with integrated touch-sensitive or motion-sensitive sensors.

The operating system 116 manages resources of the computing device 102 and may be implemented using any suitable instruction format, such as 64-bit, 32-bit, reduced instruction set computing (RISC), complex instruction set computing (CISC), and the like. The operating system is configured to abstract underlying functionality of the underlying device to applications that are executable on the computing device. For example, the operating system 116 may abstract processing, memory, network, and/or display functionality such that the applications 124 may be written without knowing "how" this underlying functionality is implemented. The applications, for instance, may provide data to the operating system to be rendered and displayed by a display device without understanding how this rendering will be performed. A variety of applications typically associated with client devices are contemplated including, but not limited to, a productivity suite that integrates multiple office productivity modules, a web browser, games, a multimedia player, a word processor, a spreadsheet program, a photo manager, and so forth.

The notification system 118 is representative of functionality to manage notifications including notifications for alerts, messages, updates, content streams and/or other updatable, "live" content that may be displayed as part of the representations of the applications. The notification system 118 may operate to obtain various notifications on behalf of applications 124 that register with the notification system. Accordingly, the notifications may be handled by the notification system 118 without executing the corresponding applications. For example, the notification system 118 may operate a centralized notification manager to receive the content updates and/or other notifications from a variety of different sources, such as from software (e.g., other applications executed by the computing device 102), from a web service via a network, and so on. For instance, a web service may include a notification module with which the notification system 118 interacts to obtain notifications using a push model, a pull model, or other suitable techniques suitable for obtaining notifications. The notification system 118 processes the notifications and manages how the notifications are displayed as part of the representations without executing the applications. This approach may be used to improve battery life and performance of the computing device 102 by not running each of the applications 124 to output the notifications.

The background manager 120 represents functionality to enable and control background tasks for applications. Generally speaking, the operating system 116 may prevent applications from running while in the background so that memory and processing resources are preserved for use by an application running in the foreground. Thus, when an application is not in the foreground, execution for the application is suspended and the application may be unable to run code. However, the operating system 116 may allow applications to define background tasks that are coordinated by the background manager 120. The background manager 120 may be configured to provide a controlled resource-managed environment that provides a mechanism for performance of some designated tasks in the background. The background manager 120 coordinates execution of the background tasks including registering applications for background tasks, firing triggers to launch the tasks, providing a host for running the tasks, controlling resource allocation for the tasks, and so forth. Upon firing of an appropriate trigger by the background manager 120, an entry point of an application registered for the particular task is launched to perform the task. The controlled resource-managed environment may allocate a limited amount of resources (time, CPU, etc.) to each background task and place other restrictions upon the kinds of resources that can be accessed and operations that can be performed. In other words, the background tasks may be "sandboxed" to enhance performance, security, and/or battery life.

The computing platform represented in FIG. 1 provides a multi-application environment by which a user may view and interact with one or more of applications 124 at a time through corresponding application UIs 126. Application UIs 126 may be exposed through different frames or viewing panes within a graphical user interface for the device and/or operating system 116. These frames or viewing panes may divide available screen real-estate into different portions that provide respective chrome elements corresponding to different applications.

The application manager 128 provides various functionality for management of applications 124, such as launching and terminating applications, switching between application windows and view, selecting states for applications as active or suspended, and tracking active applications. The application manager 128 may support a single-app mode in which interaction with a single application is provided, as well as a simultask mode as discussed herein that enables combined user access to multiple applications of the platform via respective chrome portions for the multiple applications. The application manager 128 provides one or more interfaces through which interaction with the operating system 116 is enabled, such as an application selector, application-launching interface or "application picker", a task bar, and/or a start menu, to name a few examples. The application manager 128 may also have access to, or maintain, an application queue, which may include active applications, minimized applications, or previously interacted with applications.

The application manager 128 additionally represents functionality to implement techniques for customizable bladed applications described above and below. This may include but is not limited to operations to recognize input indicative of a selection of a simultask mode and, responsive to the input, control arrangement of a user interface of the computing device to implement the simultask mode. In an example, the application manager 128 operates to configure chrome elements exposed within a user to generate a bladed view 130 that provides a compact application representation for one application in conjunction with an expanded view 131 that provides principal chrome for a different application. For example, the application manager 128 may operate to produce views for interaction with applications accessed via the web platform and send commands and data to a graphics processing system of the computing device 102 to control operation of the graphics processing system for rendering of corresponding user interfaces. Details regarding configuration of bladed views 130 and expanded views 131 in various implementations are discussed throughout this document. Generally though, the application manager 128 makes the bladed view 130 available to any applications of the platform and enables various application-specific customizations of the bladed view 130.

Although depicted as a standalone module, the application manager 128 may alternatively be implemented as a component of the operating system 116. Further, the application manager 128 may invoke or otherwise interact with the notification system 118 and/or background manager 120 to manage notifications and states of different applications. In general, any or all of the operating system 116, notification system 118, background manager 120, input module 122, application(s) 124, and application manager 128 may be implemented as separate components or combined or integrated together in different combinations in any suitable form.

Having considered the foregoing example environment, consider now a discussion of some example details and procedures for customizable bladed applications in accordance with one or more implementations.

Customizable Bladed Application Details

This section discusses details of and example procedures for customizable bladed applications in accordance with one or more implementations. Generally speaking, a multi-application environment may be provided by a device platform and/or corresponding operating system 116 that enables multi-tasking with multiple applications, frames, and application views at the same time. The operating system 116 through the application manager 128 and/or other components and functionality may manage allocation of resources for execution of the multiple applications and configuration of user interfaces for interaction with applications. Moreover, the multi-application environment may be configured to enable bladed views 130 and expanded views 131 in a simultask mode as described above and below.

Figure 2:
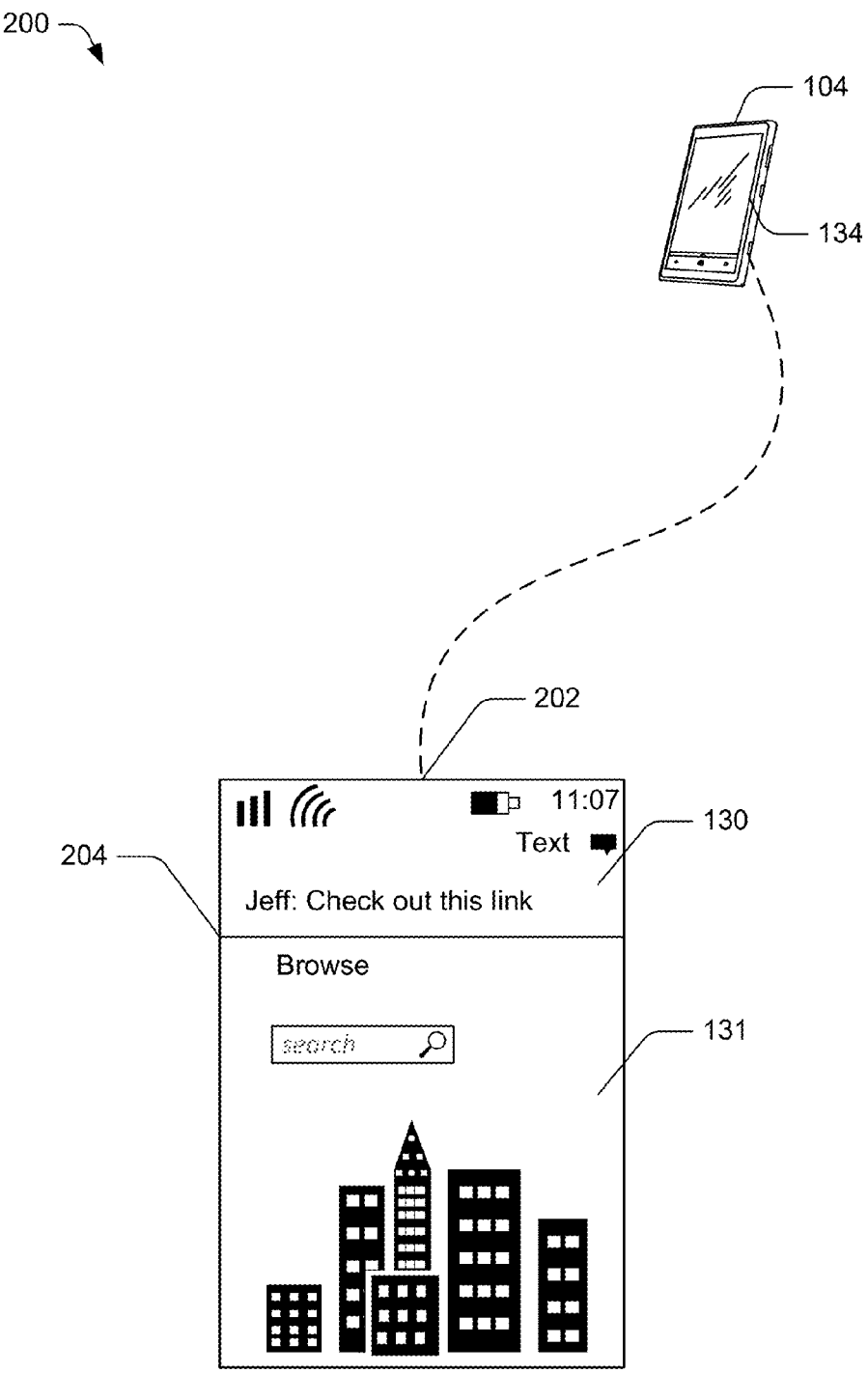
FIG. 2 illustrates an example computing device having a graphical user interface for a simultask mode in accordance with one or more implementations.

FIG. 2 illustrates generally at 200 an example computing device 102 having a graphical user interface 202 for a simultask mode in accordance with one or more implementations. In this particular example, the computing device 102 in the form of a mobile phone device 104 is depicted as rendering the graphical user interface 202 via a display device 134. In at least some embodiments, the user interface 202 fully occupies a screen or visible area of a display. As such, edges of the graphical user interface 202 may align with respective edges of the screen or visible area of the display.

Here, the graphical user interface 202, which may also be referred to as a workspace or desktop, includes a bladed view 130 for one application and an expanded view 131 for a different application. The illustrated applications include a messaging application arranged in the bladed view and a browser application arranged in the expanded view 131. Thus, the graphical user interface 202 includes separate portions such as frames or viewing panes for the different applications through which chrome elements for respective applications are exposed. The portions may be configured in various ways to expose content items and provide different kinds of functionality for interaction with respective applications.

The bladed view 130 provides a compact visual representation for a corresponding application and access to a limited set of functionality associated with the application in a small-scale view. The bladed view 130 may include a defined set of standard chrome elements for applications in a compact view that are the same for different applications in the bladed view. These standard chrome elements are defined by a device manufacturer and/or developer of the platform.

On the other hand, the expanded view 131 is configured to expose the principal chrome for application established by the application developer in a large-scale view. Naturally, principal chrome varies significantly between different applications and developers. For a particular application, though, the views of an application in a single-app mode and the expanded view 131 of a simultask mode are substantially the same and provide access to substantially the same elements and functionality. The expanded view 131 is designed to provide access to the full set of functionality and features available for the application.

In the illustrated arrangement, a portion for the bladed view 130 is represented as a bar that extends along a top edge of the graphical user interface 202. In other words, the bladed view 130 is "snapped" into position along the top edge. The portion for the expanded view 131 consumes the remainder of the available area in the user interfaces and is positioned below the bladed view 130. In this example arrangement, the bladed view 130 adjoins the expanded view 131 at a boundary 204 which visually divides the graphical user interface 202 into the different portions. In another approach, the expanded view 131 may be configured in a full-screen mode such that the expanded view 131 extends to the edges of the user interface and display in each direction. In this approach, the bladed view 130 is configured to at least partially overlay the expanded view 131.

In either case, the bladed view 130 may be located at a defined location (e.g., along the top edge or another edge) so that the bladed view 130 is consistently positioned and easily recognizable by a user regardless of which application is being presented in the bladed view. In addition or alternatively, the location of the bladed view 130 may be selectively positioned or moved into different locations. By way of example, the bladed view 130 may be snapped along each edge of a generally rectangular user interface and display. Once exposed, the bladed view 130 may be pinned or "snapped" such that the bladed view remains visible in the user interface as a user interacts with other functionality and/or navigates to expose other content and applications in the expanded view portion of the user interface. In one or more implementations, content may be exchanged between applications using defined input or gestures, one example of which is a drag and drop between the views of different applications. The bladed view may persist until the view is closed out, or a selection is made to expand the view. A selection to expand the bladed view initiates operations to swap the views of applications, details of which are discussed in relation to the example of FIG. 3.

Figure 3:
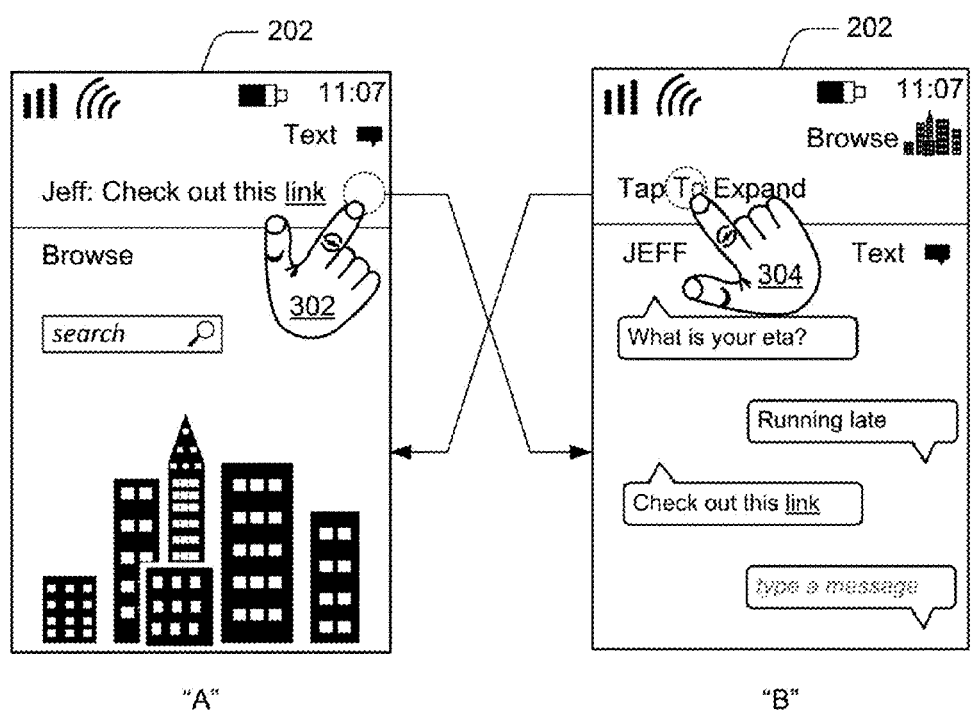
FIG. 3 illustrates an example scenario for swapping views presented in a simultask mode in accordance with one or more implementations.

In particular FIG. 3 illustrates generally at 300 an example scenario for swapping views presented in a simultask mode in accordance with one or more implementations. In this example, arrangements of the graphical user interface 202 represented by different letters "A" and "B" are depicted, which illustrate operations in a sequence to swap applications between views. For example, FIG. 3 depicts in view "A" the graphical user interface 202 arranged as in FIG. 2 with a messaging application in the bladed view 130 and a browser application in the expanded view 131. In this arrangement, a user may browse via the browser application in the expanded view to find information, such as to get a map, look-up a place to eat, or access a link. The user may decide to share some information obtained via the browser application with a friend. For example, the bladed view 130 may represent an on-going messaging conversation with a friend named "Jeff".

In order to share the information with Jeff via messaging, the user may copy content such as a link or image from the browser application and then provide input to expand the messaging application into an expanded view 130 to compose a text message to Jeff that includes the content. Interaction 302 shown in FIG. 3 represents input sufficient to initiate expansion of the bladed view 130 of the messaging application and, correspondingly, swapping of the messaging application shown in the bladed view 130 with the browser application shown in the expanded view 130. By way of example and not limitation, the interaction 302 is represented as tapping on the bladed view 130 via touch. Other types of input are also contemplated, such as defined touch gesture, a keystroke combination, a press and hold action, a swipe gesture such as swiping down on the bladed view or up on the expanded view, a slash across the bladed view, selection of the icon associated with the bladed view, a mouse click, and/or other suitable interaction configured to trigger the expansion/swapping.

Responsive to the interaction 302, view "B" is generated and exposed. Notice that in view "B", the views of the applications are swapped such that graphical user interface 202 is now arranged with the messaging application in the expanded view 131 and a browser application in the bladed view 130. This arrangement enables the user to interact with the messaging application as the main application in the expanded view 131, such as to compose and send a message to Jeff. As part of composing the message, the user may paste the image or link that is copied from the browser application into the message.

In view "B", the bladed view 130 pins the browser application in the user interface so that the user may continue to interact with some functionality of the browser and/or may quickly navigate back to the expanded view represented by view "A". For instance, interaction 304 shown in FIG. 3 represents input sufficient to initiate expansion of the bladed view 130 of the browser application and, correspondingly, swapping of the applications to return to the arrangement of view "A". In this manner, the user may selectively switch back and forth between view "A" and view "B" to access functionality of both applications, exchange content between the applications, engage in various multi-application interaction scenarios, and so forth.

Figure 4:
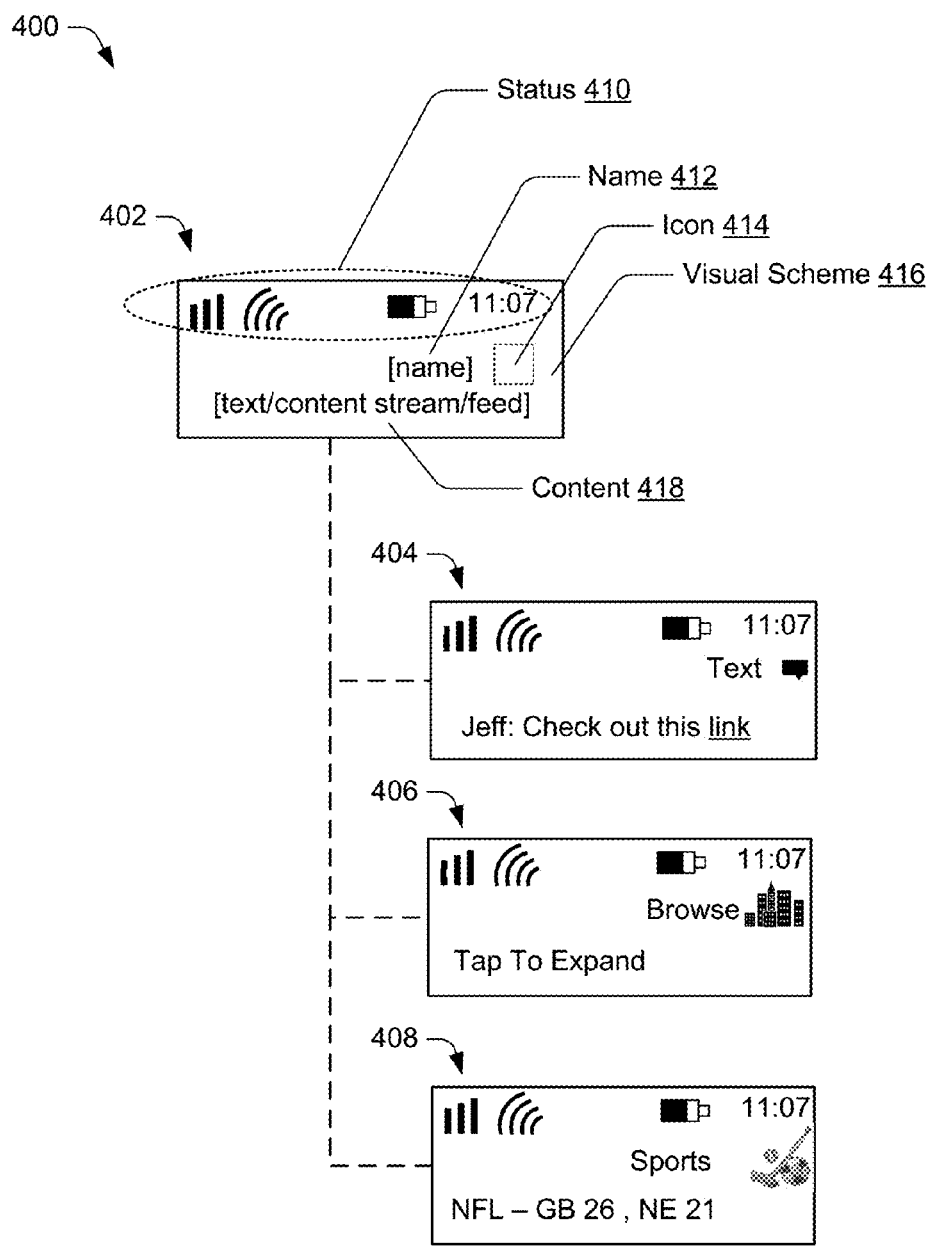
FIG. 4 illustrates an example configuration of a bladed view in accordance with one or more implementations.

FIG. 4 illustrates generally at 400 an example configuration of a bladed view in accordance with one or more implementations. In particular, FIG. 4 depicts an example template 402 for a bladed view showing an example format and layout of the bladed view. Representative example bladed views for different application that are configured according to the template 402 are also depicted including a view 404 for a messaging application, a view 406 for a browser application, and a view 408 for a sports application.

The bladed view 130 for a simultask mode may be configured in various different ways to provide a compact visual representation for a corresponding application. The bladed view 130 may include a defined set of standard chrome elements for applications in a compact view that are the same for different applications in the bladed view. These standard chrome elements are defined by a device manufacturer and/or developer of the platform. For example, the template 402 of FIG. 4 depicts an arrangement of chrome elements for the bladed view including elements for status 410 of the device, name 412 of the application, an icon 414 to identify the application, a visual scheme 416 for the view, and content 418 associated with the application. The status 410 element shows one or more status indications for the device such as for wireless connections, battery life, and the current time as illustrated. Although depicted in the example of FIG. 4, the status 410 may be hidden or omitted in some scenarios to make more space available for other elements in the bladed view. The name 412 and icon 414 for the bladed view may be extracted from files and/or metadata created when the application is installed. Customized names and icons are also contemplated. The visual scheme 416 may include colors, fonts, text size, background images/patterns, animations, and/or other visual aspects associated with the application.

Additionally, various content 418 associated with applications may be incorporated into a bladed view. Content 418 may include fixed content such as text string or image that is generated based on the last active interaction with the application. For example, a text string may reflect the last email message or text message received. In another example, an image element may present a thumbnail image captured during a prior interaction with the applications. Content 418 may also include dynamically updateable content such as a content stream or feed associated with an application. Example include but are not limited media content, call audio and/or video, a sports score tracker, financial market info, flight tracker, weather alerts, a rotating or scrolling news feed, and so forth. In at least some implementations, content is dynamically updated via notifications that are received and handled via a notification system 118 in the manner discussed herein.

Accordingly, the template 402 defines a default or standard layout for the elements that may be used across different applications. For example, the elements and arrangement of elements in the example views 404, 406, and 408 are generally the same for the different applications. In other words, these views adhere to the template. At the same time, the elements of the template are application-specific in that the elements are populated with application-specific data derived from metadata for the individual applications. Customization of various elements as well as the format and layout of the elements on an application-by-application basis are also contemplated.

By default, the elements are populated using default information available for applications, such as the default name, icon, and color scheme used for representations of the application outside of the bladed view. Further, content for the bladed view may be derived based upon notifications for the application that a notification system is already configured to obtain, process, and handle on behalf of the applications.

Metadata may also specify customizations for the bladed view, such as a short name, a different icon, a different color scheme, and a customized content stream that is accessible via a link or URL specified via the application metadata. Accordingly, the platform by way of the application manger 128 or otherwise operates to generate bladed views using either or both of application-specific customizations designated for an application or default information available for the application in the absence of designated application-specific customizations. For example, the application manger 128 may parse metadata to determine whether application-specific customizations are designated for a selected application and then configure elements for a bladed view using application-specific customizations when designated; or using default information in the absence of designated application-specific customizations.

Figure 5:
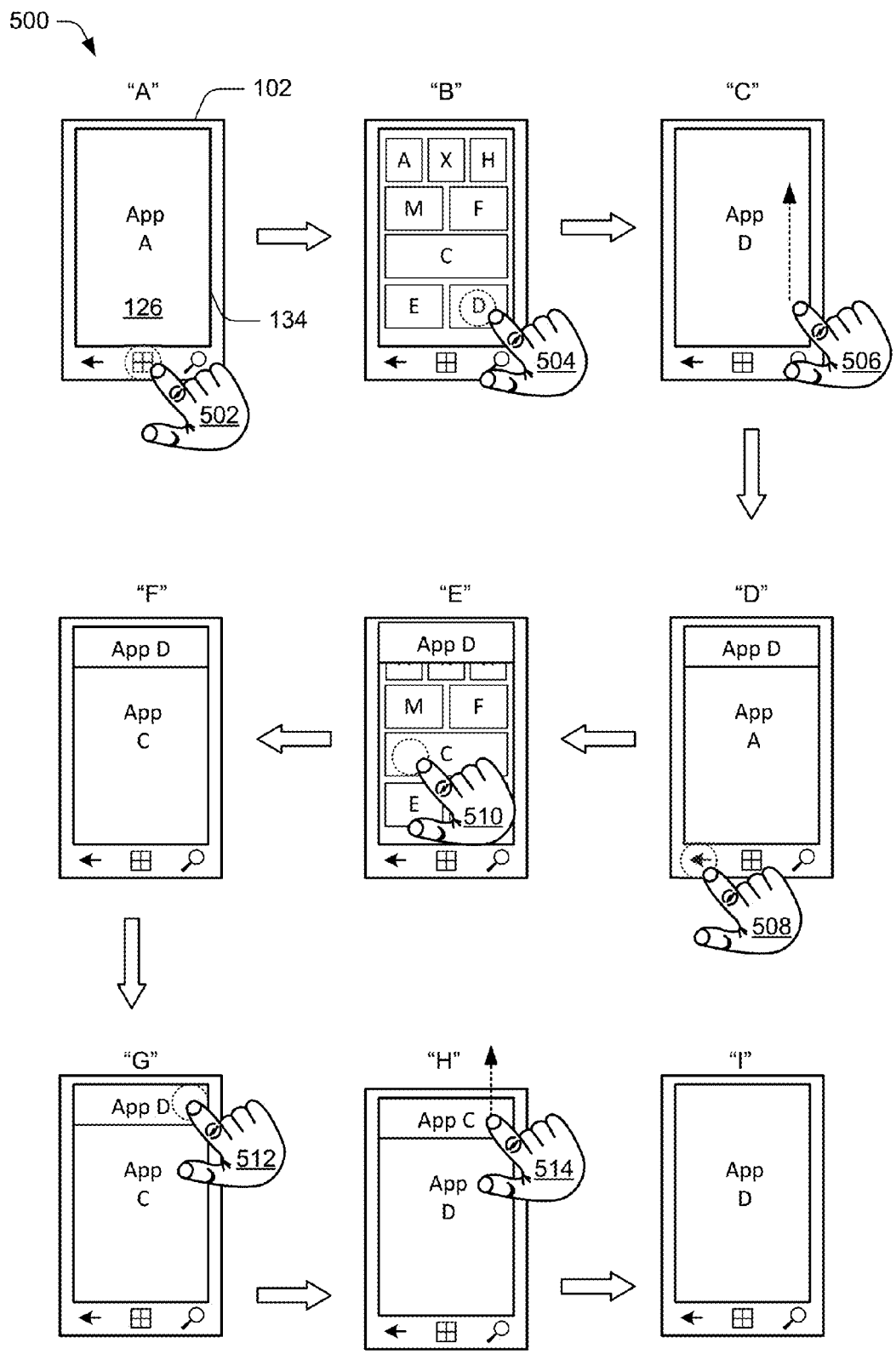
FIG. 5 illustrates an example scenario in which views for a simultask mode are generated responsive to user interaction in accordance with one or more implementations.

FIG. 5 illustrates generally at 500 an example scenario in which views for a simultask mode are generated responsive to user interaction in accordance with one or more implementations. In particular, FIG. 5 depicts an example having various views label "A" to "I" that represent a sequence of operations that occur during multi-application interaction scenarios. View "A" represents a single-app mode for interactions on a computing device 102 in the form of a mobile device with a single application at a time, namely application A. In this example, the user interface 126 for application A is in a full-screen mode that extends to the edges of the display device 134 of the illustrated computing device 102. Here, application A represents an active, running application.

Interaction 502 may occur to launch an application selector to select an application other than application A to interact with. For example, interaction 502 may represent selection of a home or start control to navigate to an application selector that provides visual representations of various applications each of which is selectable to launch a corresponding application. View "B" represents an example application selector configured as a start page that has an arrangement of different tile elements corresponding to different applications. Other configurations of an application selector and visual representations are also contemplated, such as icons, menu items, tool menu elements and other mechanisms to represent and enable selectable access to applications.

Interaction 504 represents selection of an application to launch or activate via the application selector, which in this example is application D. Interaction 504 causes launch of application D into a single-app mode as represented by view "C". Here, application A may remain active, but may be placed in the background in a background state. Now, at least application A and application D are currently launched on the platform, with application D being the main, foreground application and application A being the previous main application now placed in the background.

In this context, appropriate interaction 506 may occur to activate a simultask mode in which both application A and application D are accessible via respective portions in the user interface 126. Various input, sequence of inputs, and/or gestures may be defined as triggers for the simultask mode. In the illustrated example, interaction 506 involves an upward swipe on the exposed interface for application D to cause arrangement of application D into a bladed mode that is pinned along a top edge of the user interface. If supported by the platform, swiping in other directions may cause pinning of a selected application to a corresponding edges of the user interface.

View "D" provides a representation of a simultask mode in which application D is in bladed view and application A is in expanded mode. In this example, application A may be selected for placement in the expanded mode based on being the last application that is used prior to application D (e.g., application A has priority in an application queue).

Now suppose a user wants to launch another application. In order to do so, the user may again access the application selector introduced in view "B". Here, the application picker is accessed via interaction 508 to select a back button. Other ways to navigate back to the selector are also contemplated. In any event, view "E" shows the application selector being exposed and further interaction 510 to select application C via the application selector. The result is view "F" which provides a representation of a simultask mode in which application D remains in bladed view and application C is now in expanded mode. Notice that application D remains pinned or snapped in the user interface throughout the interaction represented by views "D" to "F". Thus, application D is accessible throughout this sequence. As such, interactions between application D and multiple different applications are facilitated while application D is in the bladed view.

View "G" represents interaction 512 to initiate a swap between application D and application C comparable to the example of FIG. 3 discussed previously. View "H" is generated responsive to interaction 512. In particular, view "H" provides a representation of a simultask mode in which application C is now in bladed view and application D is in expanded view. View "H" further represents interaction to closeout or otherwise conclude the simultask mode and bladed view, and thereby return to single-app mode. Again, various input, sequences of inputs, and/or gestures may be defined as triggers to conclude simultask mode. In the illustrated example, interaction 514 involves an upward swipe on the bladed view portion to close the bladed view for application C and cause arrangement of application D into a single-app mode, as represented in view "I". Other techniques to closeout a bladed view are also contemplated, such as swiping left or right, selecting a close button or control, using a keystroke or hardware toggle, or other suitable closeout instrumentality.

The simultask mode and bladed views as just described enable a variety of different multi-application interaction scenarios. For instance, a user may use the simultask mode during an ongoing voice call or messaging session to access other information from the device, such as contact information, internet content, documents, and so forth. The simultask mode and bladed views also facilitate exchange of content between applications. For example, a user may snap a presentation application to the bladed view and then navigate to different productivity applications (e.g., spreadsheet, word processor, browser, etc.) to access content and transfer the content to the presentation application for inclusion in a presentation document via the bladed view. In another scenario, a user may snap a particular application to the bladed view to keep track of corresponding information, such as pinning of a sports application in the bladed view to track the score of a football game, pinning a social networking application to track a social network feed, or pinning a financial application to track market news or stock prices.

The platform by way of the application manager 128 supports arrangement of bladed views for any displayable application. The simultask mode may be activated manually based on explicit user input to select applications for bladed views and/or expanded views. The manual selection may occur via an application selector as described herein as well as during user interaction with graphical user interfaces 126 for applications, some examples of which are shown in the scenario of FIG. 5.

In addition or alternatively, the simultask mode may be activated automatically according to defined workflows or interaction scenarios. For example, a notification event received in the background during interaction with an application in a single-app mode may cause the platform to launch the simultask mode and generate the bladed view for an application associated with the notification. Examples include but are not limited to generating a bladed view of a phone application for an incoming call or a bladed view of a messaging application when a text message is received. Alternatively, the main application that the user is interacting with may be automatically snapped to the bladed view when a triggering event is detected to enable another application to be launch into the expanded view. For example, an incoming video chat may initiate a switch from a single-app mode for a word processing application to a simultask mode in which the word processing application is arranged in a bladed view and the video chat is launched in the expanded view. Various other examples of workflows or interaction scenarios that can automatically trigger a simultask mode are also contemplated. Additional details regarding these and other aspects of customizable bladed applications are discussed in relation to additional example scenarios and user interfaces of FIG. 6-9.

Figure 6:
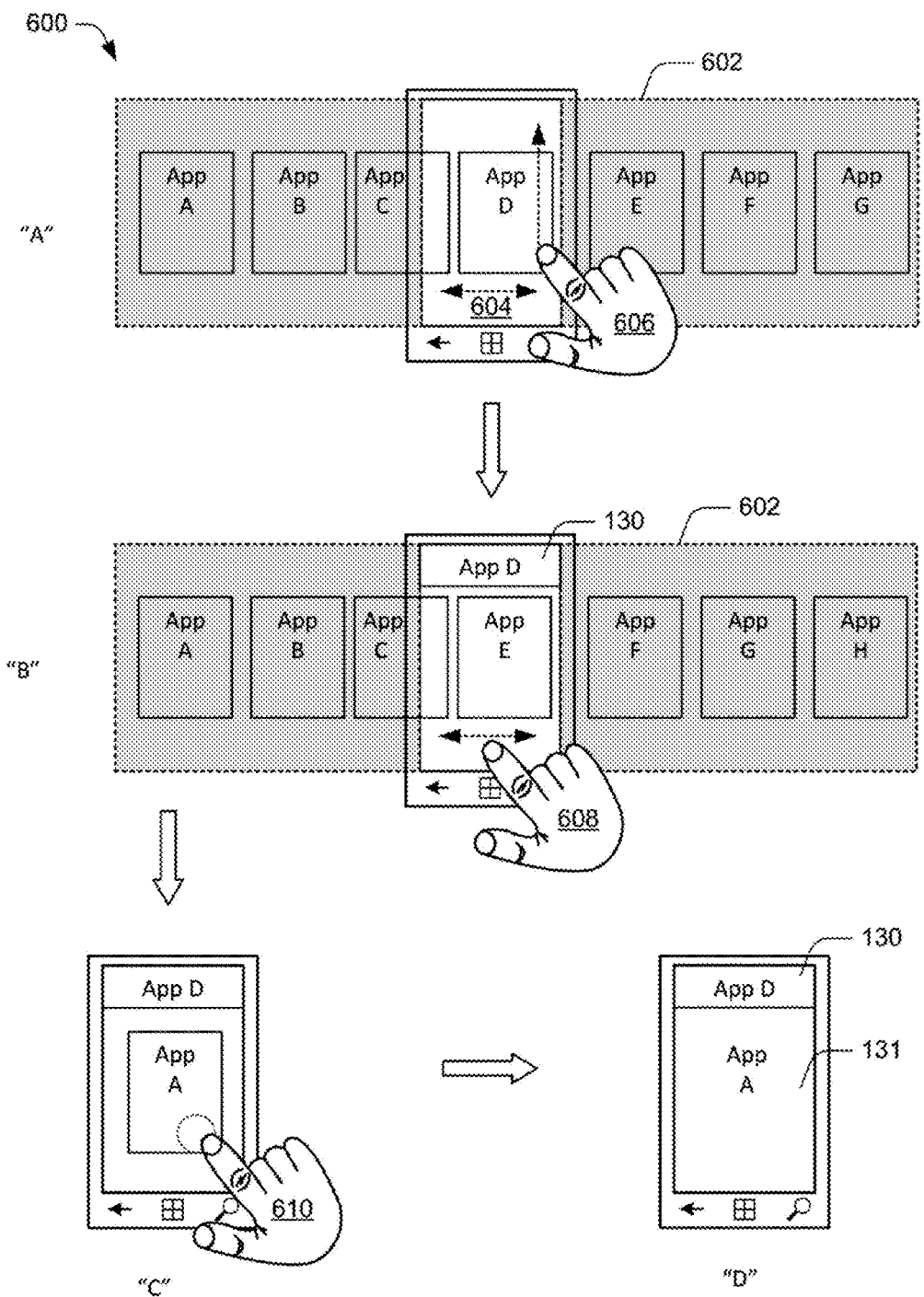
FIG. 6 illustrates an example scenario for activation of simultask mode via an application selector in accordance with one or more implementations.

FIG. 6 illustrates generally at 600 an example scenario for activation of simultask mode via an application selector in accordance with one or more implementations. Here, view "A" represents an example application selector 602 that may be accessible via the platform. In the depicted example, the application selector 602 provides a scrollable list of applications that are active for a corresponding device. Note that just a portion of the application selector 602 is visible on the display, with shaded portions indicating that the portions are outside of the viewable area. The example application selector 602 includes visual representations for a plurality of applications A thru G. The application selector 602 enables scrolling to navigate the visual representations, such as via horizontal scrolling to view different visual representations at different times. Other arrangements of an application selector 602 are also contemplated, such as a tile based interface as in the examples of FIG. 5, a vertically scrollable list, a grid layout, a carousel or wrap around interface, and so forth Each visual representation in the application selector 602 is selectable to launch a corresponding application in a single-app mode. Additionally, the application selector 602 provides functionality to manually activate a simultask mode as illustrated in the example of FIG. 6. In particular, scrolling 604 and/or other navigational input may occur to navigate to a visual representation of an application interest. Here, the scrolling 604 places application D in the visible area.

Interaction 606 may then occur in a prescribed manner to cause arrangement of application D in a bladed view. In the illustrated example, interaction 606 involves an upward swipe on the exposed visual representation for application D to cause arrangement of application D into a bladed mode, pinned or snapped to top edge of the user interface. If supported by the platform swiping in other directions may cause snapping of a selected application to a corresponding edge of the user interface. Other types of input, sequence of inputs, and/or gestures that operate as triggers to initiate creation of a bladed view for a selected application via the application selector are also contemplated.

In accordance with the interaction 606, view "B" depicts application D arranged in a bladed view 130 with the application selector 602 remaining as the main application in an expanded view. Further interaction 608 may occur with the application selector 602 to browse visual representations of applications provided via the application selector 606. Interaction 608 may again involve scrolling as illustrated, although other types of navigational inputs are also contemplated. View "C" represents results of the interaction 608 to position a visual representation for application A within the visible display area, such as by scrolling to the left in example view "B". Now, a selection 610 of application A may occur in a prescribed manner to choose application A as the main application. The selection 610 in the depicted example involves tapping on the visual representation for application A. Other types of input to effectuate a selection are also contemplated, some further examples of which include a double click, a pinch gesture, a drag on a corner, a voice command, and so forth.

Responsive to the selection 610, view "D" is generated and exposed. View "D" represents an arrangement of the user interface in a simultask mode. To do so, arrangement of the chrome elements is controlled by the platform to generate an expanded view 131 for application A that is presented in conjunction with the previously generated bladed view 130 for application D. As noted previously the bladed view 130 provides a compact application representation of an application with an established and/or limited set of chrome elements. The bladed view 130 may include a plurality of application-specific elements populated with data derived from metadata for the application using designated customizations or using default application information in the absence of customizations. The expanded view is configured to provide principal chrome of a corresponding application as a main application in the user interface.

Figure 7:
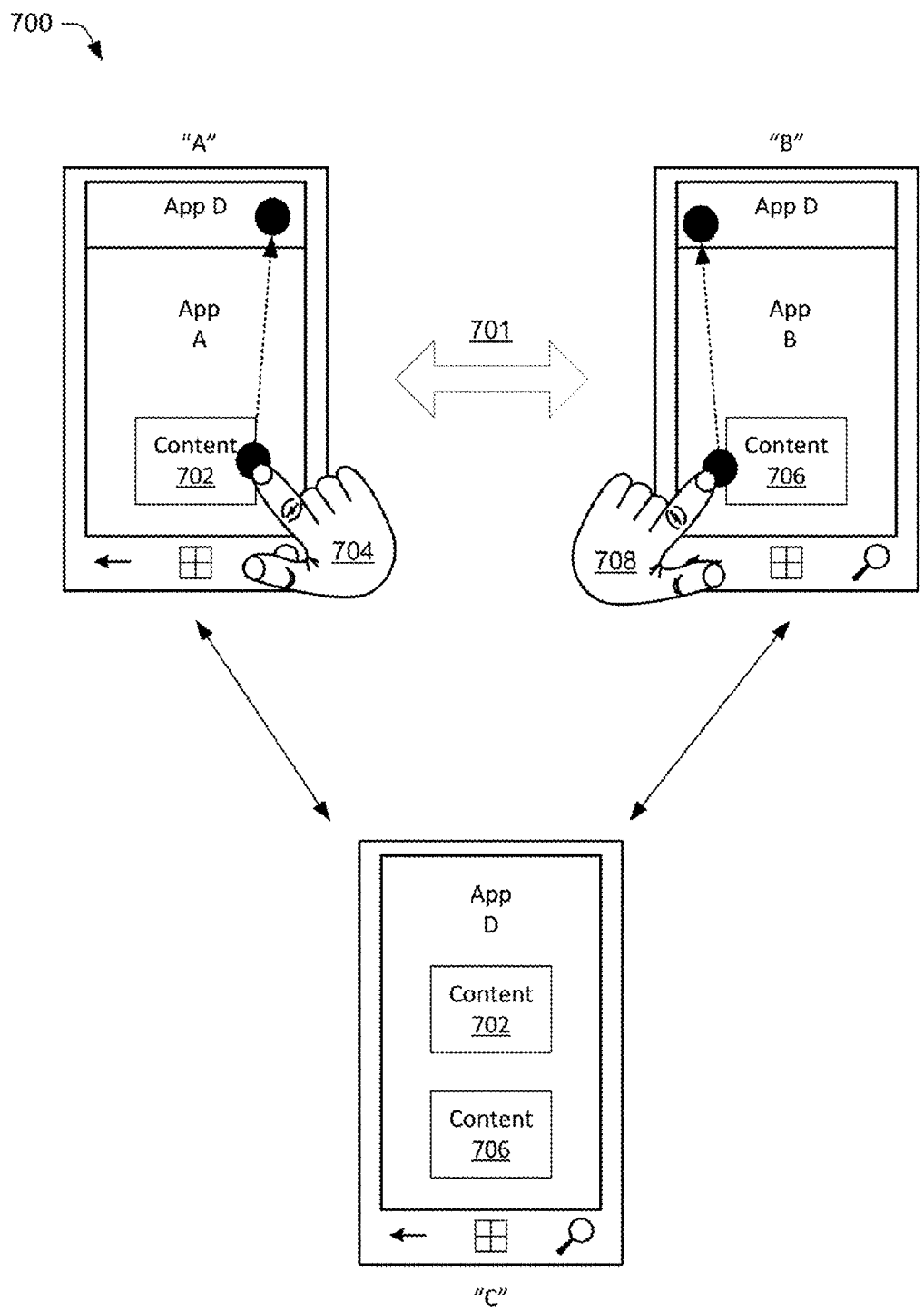
FIG. 7 illustrates an example scenario for content exchange between applications using simultask mode in accordance with one or more implementations.

FIG. 7 illustrates generally at 700 an example scenario for content exchange between applications using simultask mode in accordance with one or more implementations. Here, view "A" depicts a simultask mode as described herein in which application D is in a bladed view and application A is in expanded view. View "B" depicts a simultask mode as described herein in which application D is still in the bladed view, but application B is now in the expanded view. Navigation 701 may occur to switch back and forth between view "A" and view "B" using various techniques and application selector functionality, examples of which were discussed previously herein.

Application A may include selectable content 702 such as an image, text, document, structured data, a media file, and so forth. Interaction 704 may occur in view "A" to select the content 702 and associate the content with application D via the bladed view. As illustrated, interaction 704 involves selecting the content 702, dragging the content to within boundaries of the bladed view, and dropping the content 702 on the bladed view. This action causes exchange of the content 702 between application A and application D. In response, the content 702 may be copied, moved, or otherwise transferred to application D.

Application B may also include selectable content 706. Interaction 708 comparable to interaction 704 may occur in view "B" to select the content 706 and associate the content with application D via the bladed view. This action causes exchange of the content 706 between application B and application D. Again, the content 706 may be copied, moved, or otherwise transferred to application D.

View "C" represents a single-app mode for application D that may be exposed following the example interaction 704 and interaction 708. Now, content 702 and content 706 is depicted as being associated with application D. Thus, the scenario of FIG. 7 provides an illustrative example of how simultask mode and bladed views may be utilized for convenient exchange of content between applications. The exchange of content may be accomplished in fewer steps than traditional approaches since the bladed view remains visible and the user does not have to launch application D each time content is transferred to application D.

Figure 8:
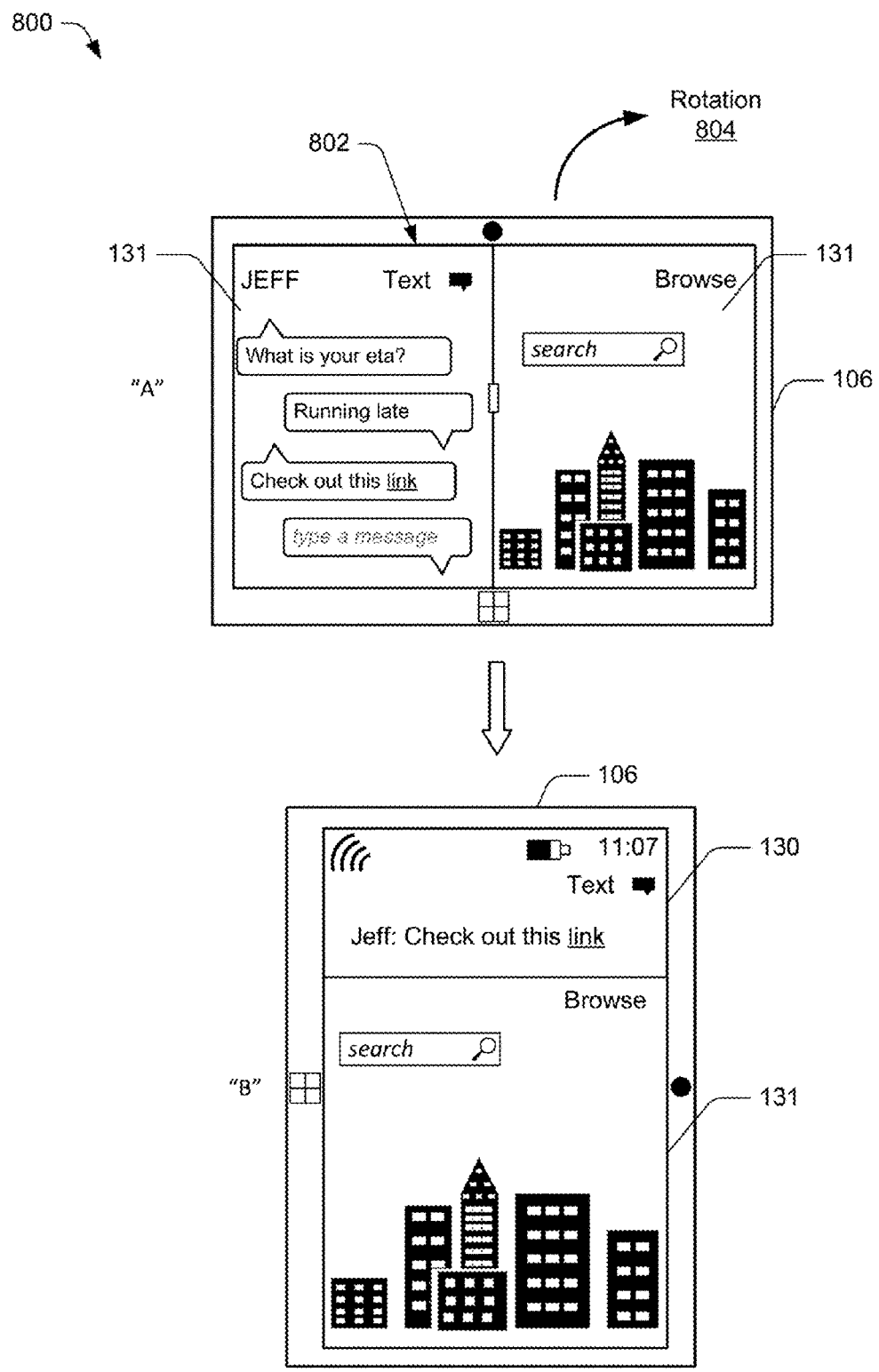
FIG. 8 illustrates an example scenario in which a simultask mode with a bladed view is activated responsive to device manipulation in accordance with one or more implementations.
Figure 9:
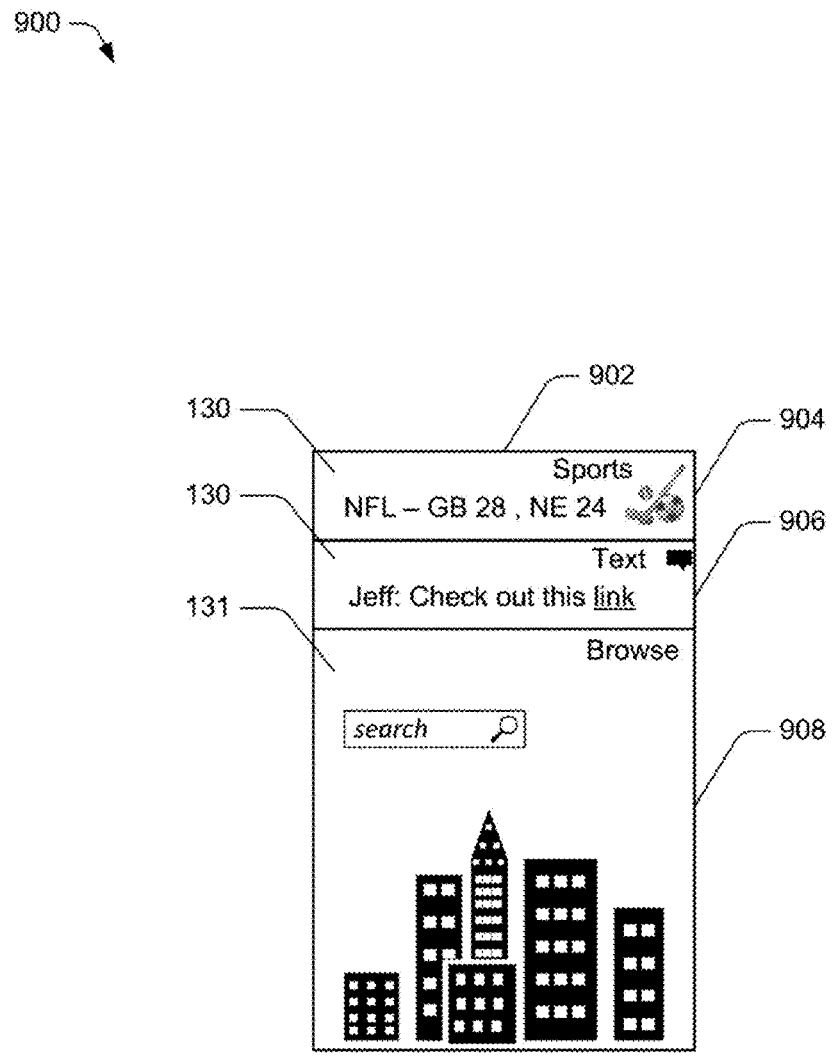
FIG. 9 illustrates an example user interface arranged to include bladed views for multiple applications in accordance with one or more implementations.

FIG. 8 illustrates generally at 800 an example scenario in which a simultask mode with a bladed view is activated responsive to device manipulation in accordance with one or more implementations. Here, a computing device 102 in the form of a tablet 106 is depicted. Because a tablet device (or large mobile phone) may have more available screen real estate than smaller devices, it may be possible to expose a side-by-side view of multiple applications. An example side-by-side mode 802 is represented in view "A". In the side-by-side mode 802 the display area is divided approximately in half with expanded views 131 presented for both a messaging application and browsing application in respective portions. The view "A" represents interaction with the tablet in a landscape orientation.

In this context, activation of simultask mode may be triggered in response to manipulation of a device into a different orientations and/or a different configurations. In the depicted example, rotation 804 of the tablet ninety degrees to the right is represented to achieve the view "B". In view "B", the user interface has been arranged responsive to the rotation 804 to create a bladed view 130 for the messaging application that is snap to a top edge of the user interface. The browser remains in an expanded view 131. The view "B" represents interaction with the tablet in a portrait orientation. In an implementation, the view "B" may be dependent upon the direction of rotation. For instance, rotation ninety degrees to the left may produce a view in which the browser is in the bladed view instead of the messaging application. In either case, rotation of the device back into the landscape orientation causes a return to the side-by-side mode 802.

While rotation is illustrated, other types of device manipulation configured to cause transitions to and from a simultask mode are also contemplated. For example, opening and closing of a foldable display device may operate to trigger different modes. In another example, attachment and removal of an external or supplemental display to the device may cause mode transitions. In yet another example, selectively using a device to project or mirror an image to a different screen may transitions to or from a simultask mode.

In an implementation, the simultask mode may be configured to support interaction with more than two applications at a time. In this case, more than one application may be placed into bladed views exposed via a user interface. By way of example, consider FIG. 9, which illustrates generally at 900 an example user interface arranged to include bladed views for multiple applications in accordance with one or more implementations. Here, a graphical user interface 902 is depicted as having portions for interaction with multiple applications including portions for a sports application 904, a messaging application 906, and a browser application 908. Both the sports application 904 and the messaging application 906 are arranged using bladed views 130 as describe throughout this document. The browser application 908 appears in an expanded view. In this arrangement, three or more applications may be stacked in the user interface using respective views. Applications may be placed in the different views using an application selector as discussed in relation to FIG. 6 and elsewhere herein. Additionally, the applications in the different views may be swapped in the manner discussed in relation to FIG. 3 and elsewhere herein. The bladed portions may be snapped in a stack along the top edge as illustrated or in relation to another designated edge. Alternatively, bladed portions may be snapped to different edges such as having the sports application 904 snapped to the top edge, the messaging application snapped to the bottom edge, and the browser application 908 in expanded view between the two blade portions. Accordingly, a variety of different arrangements of two or more applications may be supported via a simultask mode as discussed herein. Additional details regarding these and other aspects of customizable bladed applications are discussed in relation to the following example procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the examples of FIGS. 2-9. By way of example, aspects of the procedures may be performed by a suitably configured computing device, such as by a computing device 102 as in FIG. 1 that includes or makes use of an operating system 116, notification system 118, application manager 128, and/or other components.

Functionality, features, and concepts described in relation to the examples of FIGS. 1-9 may be employed in the context of the procedures described herein. Further, functionality, features, and concepts described in relation to different procedures below may be interchanged among the different procedures and are not limited to implementation in the context of an individual procedure. Moreover, blocks associated with different representative procedures corresponding figures herein may be applied together and/or combined in different ways. Therefore, it is to be appreciated that individual functionality, features, and concepts described in relation to different example environments, devices, components, figures, and procedures throughout this document may be used in any suitable combinations and are not limited to the particular combinations represented by the enumerated examples.

Figure 10:
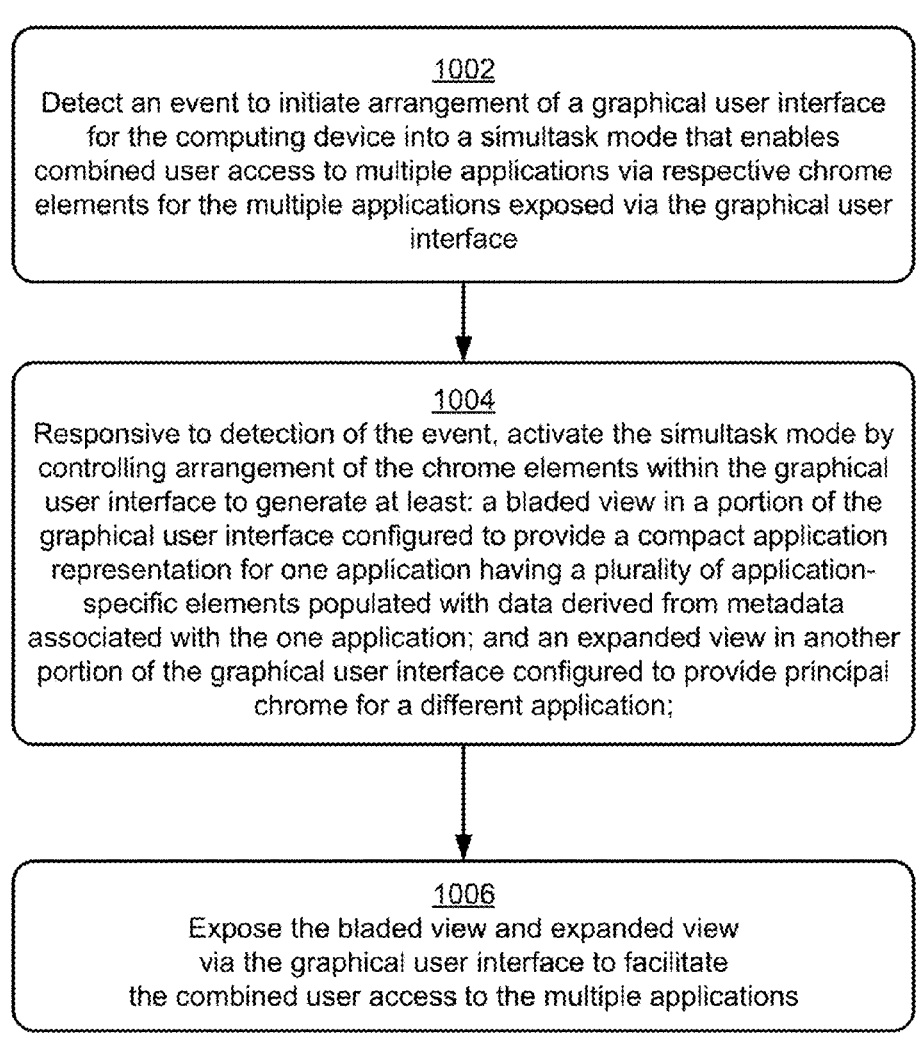
FIG. 10 depicts an example procedure in which a simultask mode is activated in accordance with one or more implementations.

FIG. 10 depicts an example procedure 1000 in which a simultask mode is activated in accordance with one or more implementations. An event is detected to initiate arrangement of a graphical user interface for a platform into a simultask mode that enables combined user access to multiple applications of the platform via respective portions for the multiple applications exposed via the graphical user interface (block 1002). For example, a simultask mode as described here may be implemented by an operating system 116, via an application manager 128 or otherwise. The simultask mode may be activated in response to different events including user interaction to manually activate simultask mode and/or defined workflows and scenarios that automatically trigger simultask mode. The platform may make the simultask mode available for any combination of displayable applications supported by the platform.

In this context, various different events may be detected that are configured to activate the simultask mode. For example, the event may relate to user input defined as a trigger for a bladed view that is applied during interaction with an application in a single-app mode. In another example, the event involves user selection made via an application selector accessible via the platform to identify one application for a bladed view and identify a different application for the expanded view. In addition or alternatively, the event that is detected may correspond to a notification event related to a particular application that is received in the background during interaction with a different application in a single-app mode. In this example, the particular application may be in a non-running state. Accordingly, the notification is effective to cause the platform to launch the simultask mode and generate a bladed view for the particular application based on the notification. The event may also correspond to changing of the orientation of the computing device or otherwise manipulating the device as discussed on relation to the examples of FIG. 8.

Responsive to detection of the event, the simultask mode is activated by controlling arrangement of the chrome elements within the graphical user interface to generate at least a bladed view in a portion of the graphical user interface configured to provide a compact application representation for one application having a plurality of application-specific elements populated with data derived from metadata associated with the one application; and an expanded view for a different application in another portion of the graphical user interface configured to provide principal chrome for the different application (block 1004). Then, the bladed view and expanded view are exposed via the graphical user interface to facilitate the combined user access to the multiple applications (block 1006).

Various example details and arrangements of views for a simultask mode are discussed above and below. The views include at least one bladed view 130 for a corresponding application as discussed herein. The bladed view is available to configure a compact application representation for any displayable application via the platform using corresponding metadata to populate the plurality of application-specific elements. By way of example and not limitation, the bladed view may be configured as a bar placed at a fixed location within the graphical user interface and having a pre-arranged layout of the application-specific elements, such that a consistent compact application representation is created across different applications when the application-specific elements are populated with data for the different applications.

In one approach, controlling arrangement of elements for the bladed view includes recognizing application-specific customizations indicated by the metadata associated with the one application and populating the application-specific elements using the metadata. Application-specific customizations may include but are not limited to one or more of an icon, a color scheme, a title, a content stream, or a background image specified for the one application. The content stream or other suitable content elements included with the bladed view are configured to present dynamically updatable content for the one application. In an example, the updatable content is obtained from operation of the one application in a background state while the bladed view is exposed. In addition or alternatively, updatable content for the bladed view may be obtained via a notification system 118 of the platform. The notification system 118 is used to obtain content on behalf of multiple applications, such that the content updates may be obtained without running corresponding applications. This means that applications associated with a bladed view may be kept in a suspended or non-running state, which conserves device resources such as memory, processing power, and battery life for other device functionality. The arrangement of the chrome elements may also be configured to substantially consume available screen-real estate of a display device used to present the graphical user interface. In other words, the combination of the bladed view and expanded view may extend to the boundaries of the available display area, with the bladed view adjoining the enhanced view at a boundary in a stack arrangement or overlaying the enhanced view at least partially.

Figure 11:
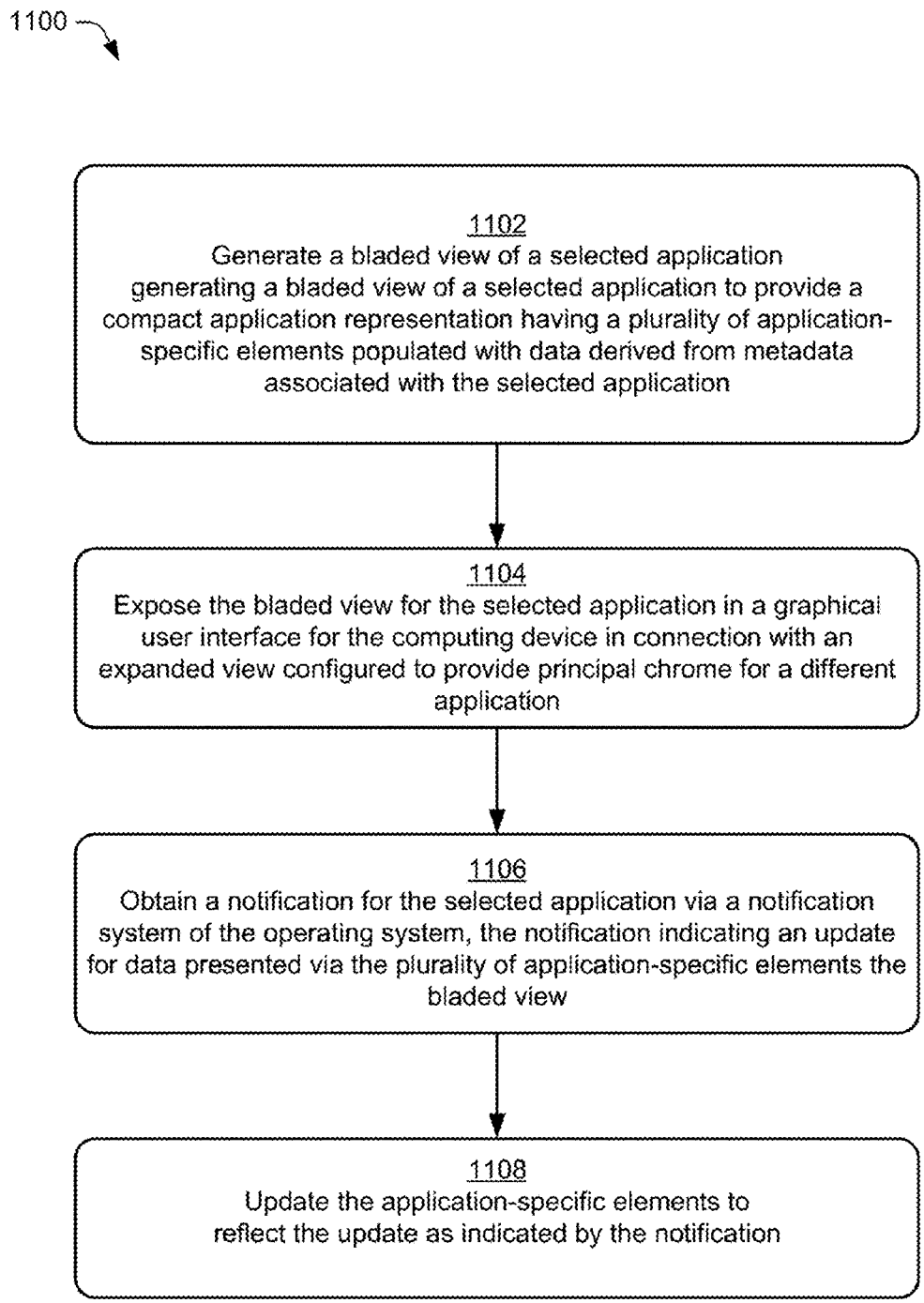
FIG. 11 depicts an example procedure in which updates for a bladed view are obtained via a notification system in accordance with one or more implementations.

FIG. 11 depicts an example procedure 1100 in which updates for a bladed view are obtained via a notification system in accordance with one or more implementations. A bladed view of a selected application is generated to provide a compact application representation having a plurality of application-specific elements populated with data derived from metadata associated with the selected application (block 1102). Once generated, the bladed view for the selected application is exposed in a graphical user interface for the computing device in connection with an expanded view configured to provide principal chrome for a different application (block 1104). For example, bladed views may be produced, rendered and utilized in the manner discussed in relation to the preceding examples of FIGS. 1 to 10. As mentioned, an operating system 116 for a platform may include an application manager 128 or comparable functionality configured to generate bladed views for any displayable application of the computing device using corresponding metadata. Bladed views created for various applications may be presented in a simultask mode along with an expanded view of another application thereby enabling combined user access to multiple applications. In one approach, generation of a bladed view for a selected application includes parsing metadata for the selected application, extracting data from the metadata to populate a plurality of application-specific elements, and populating the plurality of application-specific elements with the extracted data. The extracted data may include default data for the application and/or designated customizations that are used to generate a corresponding bladed view. Accordingly, the operating system is configured to generate bladed views using application-specific customizations indicated by metadata for the application when designated or using default information available for the application in the absence of designated customizations.

A notification for the selected application is obtained via a notification system of the operating system, the notification indicating an update for data presented via the plurality of application-specific elements in the bladed view (block 1106) and the application-specific elements are updated to reflect the update as indicated by the notification (block 1108). As mentioned, the operating system may leverage a notification system 118 configured to manage notification on behalf of multiple applications. Notifications may specify updates for updateable content elements that are included with bladed views 130. Accordingly, a content stream, image, new snippet, game score, stock ticker or other updatable content may be updated based on notifications that are managed via a notification system 118 implemented via the platform.

Figure 12:
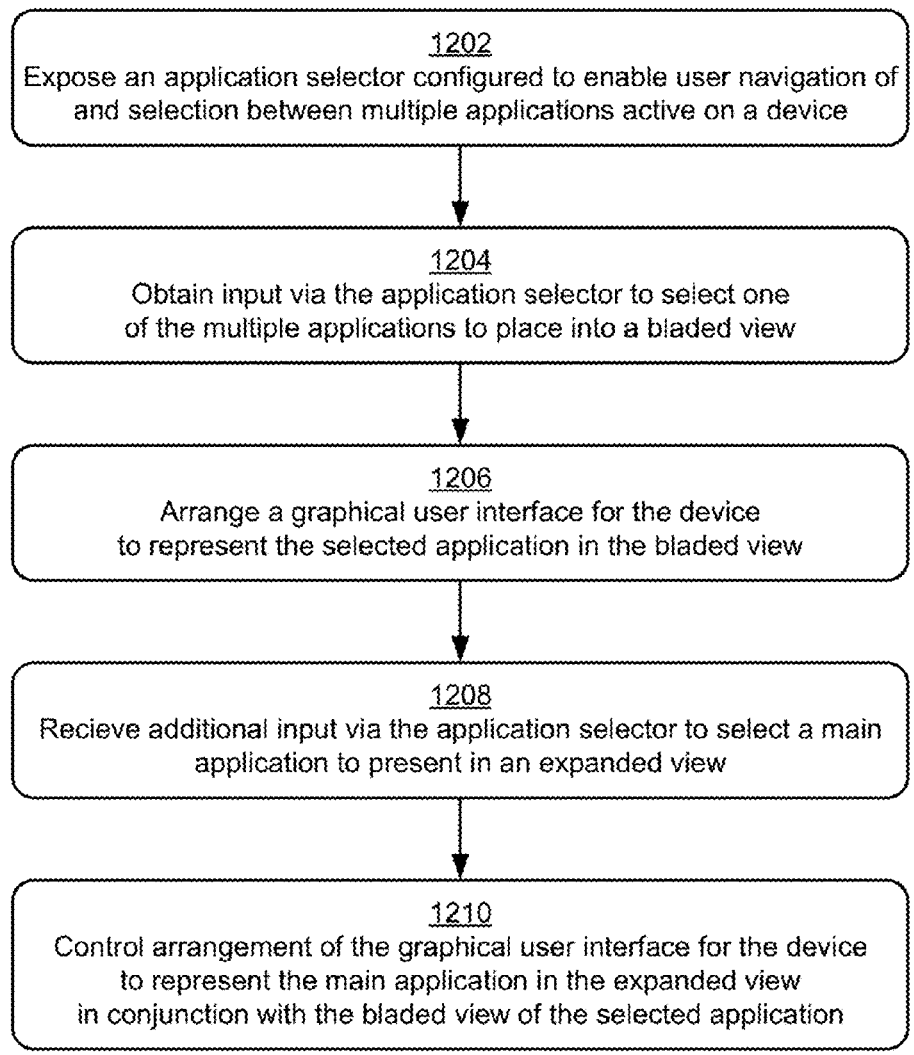
FIG. 12 depicts an example procedure in which an application selector is used to activate a simultask mode in accordance with one or more implementations.

FIG. 12 depicts an example procedure 1200 in which an application selector is used to activate a simultask mode in accordance with one or more implementations. An application selector is exposed that is configured to enable user navigation of and selection between multiple applications active on a device (block 1202). Input is obtained via the application selector to select one of the multiple applications to place into a bladed view (block 1204) and a graphical user interface for the device is arranged to represent the selected application in the bladed view (block 1206). Additional input is received via the via the application selector to select a main application to present in an expanded view (block 1208) and arrangement of the graphical user interface for the device is controlled to represent the main application in the expanded view in conjunction with the bladed view of the selected application (block 1210).

Example techniques related to using an application selector to activate a simultask mode were previously discussed in relation to FIG. 6 and elsewhere herein. Various configurations of an application selector are contemplated including but not limited to the examples of FIGS. 5 and 6. Various kinds of input may be used also. As but one example, a swiping gesture or action may be used to cause placement of an application in the bladed view and a tap or press gesture may be used to select the main application as represented in FIG. 6. Then, arrangement of the graphical user interface to create the simultask view may occur in various ways discussed herein, including but not limited to operations in accordance with the example procedure 1000 of FIG. 10 and the example details and scenarios of FIGS. 2-9.

For instance, the bladed view may include application-specific customizations that are designated by an application as discussed previously. Various customizations are contemplated examples of which were discussed in relation to FIG. 4 and elsewhere herein. In order to arrange the bladed view and apply any available customizations, the platform may operate to determine whether application-specific customizations are designated for the selected application by parsing metadata for the selected application. Elements of the bladed view are then configured in accordance with the determination. In particular, application-specific customizations indicated by the metadata are used to arrange the elements of the bladed view when designated. In the alternative, default information available for the selected application is used to arrange the elements of the bladed view in the absence of designated application-specific customizations.

In conjunction with procedure 1200, the platform may additionally support swapping of applications between a bladed view 130 and an expanded view, such as in the example of FIG. 3 and elsewhere herein. In an example, the swapping involves recognizing input applied in relation to the bladed view to cause expansion of the selected application within the graphical user interface. Then, responsive to the input, views are switched for the selected application and the main application, such that the main application is now switched to the bladed view in conjunction with the selected application switched to the expanded view. Additionally, content streams and other updatable elements presented in the bladed view may be dynamically updated. This may occur through direct interaction with an application to obtain the updates and/or using a notification system 118 as discussed in relation to example procedure 1100 of FIG. 11 and elsewhere herein.

Having considered some example procedures, consider now a discussion of an example system and devices that may be employed in one or more implementations.

Example System and Device

Figure 13:
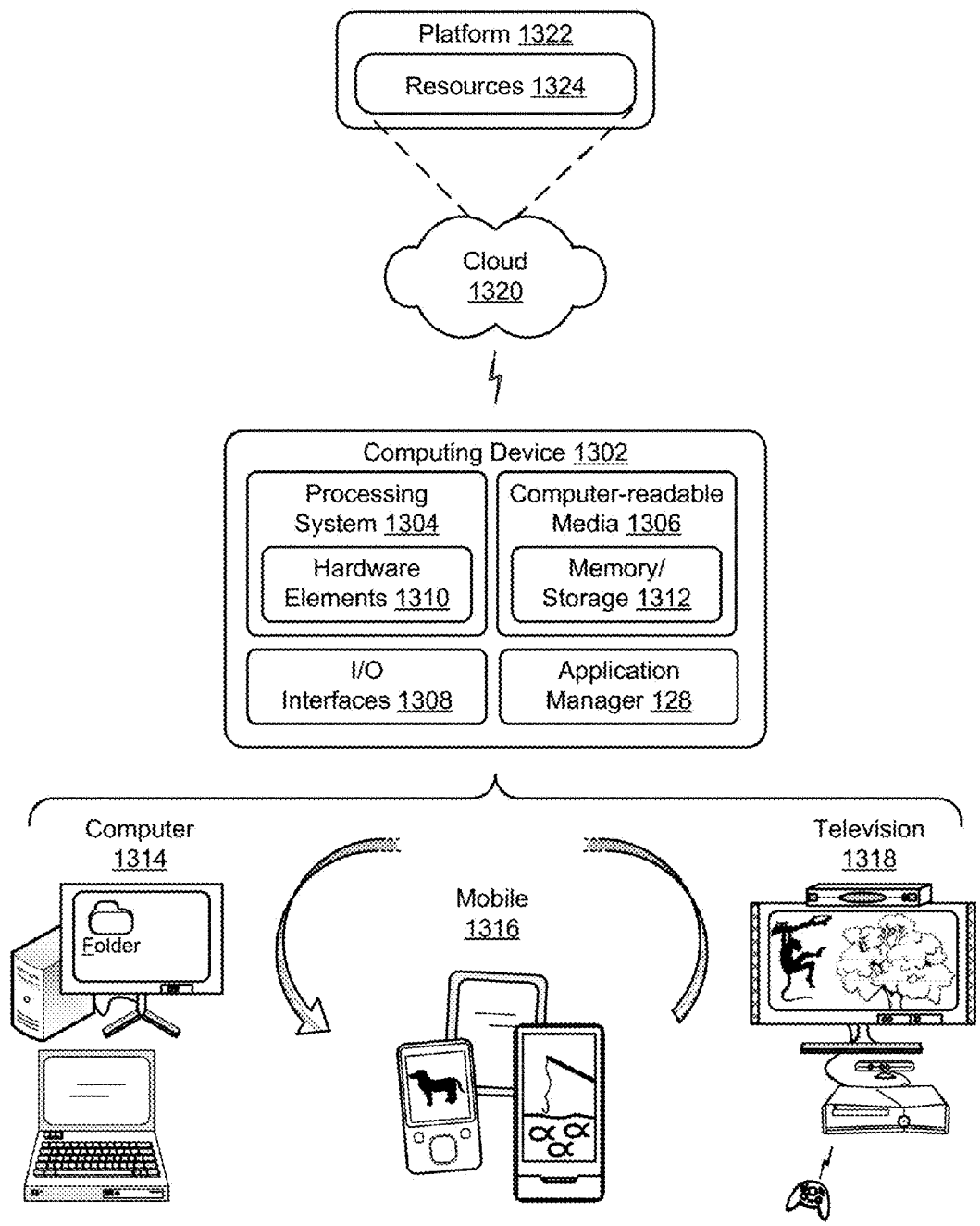
FIG. 13 illustrates an example system having devices and components that may be employed to implement aspects of the techniques described herein.

FIG. 13 illustrates an example system generally at 1300 that includes an example computing device 1302 that is representative of one or more computing systems and/or devices that may implement the various techniques described herein. The computing device 1302 may be, for example, a server of a service provider, a device associated with the client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 1302, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 116, notification system 118, applications 124, application manager 128 and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules as a module that is executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, portable music player, portable gaming device, a tablet computer, a multi-screen computer, and so on. The computing device 1302 may also be implemented as the television 1318 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. This is illustrated through inclusion of the application manager 128 on the computing device 1302. The functionality of the application manager 128 and other modules may also be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout the system 1300. For example, the functionality may be implemented in part on the computing device 1302 as well as via the platform 1322 that abstracts the functionality of the cloud 1320.

EXAMPLE IMPLEMENTATIONS

Example implementations of customized bladed applications described herein include, but are not limited to, one or any combinations of one or more of the following examples:

Example 1

A method implemented by a computing device to facilitate user access to content associated with multiple applications at the same time thru arrangement of chrome elements for the multiple applications comprising: detecting an event to initiate arrangement of a graphical user interface for a platform into a simultask mode that enables combined user access to multiple applications of the platform via respective portions for the multiple applications exposed via the graphical user interface; responsive to detection of the event, activating the simultask mode by: controlling arrangement of the chrome elements within the graphical user interface to generate at least: a bladed view in a portion of the graphical user interface configured to provide a compact application representation for one application having a plurality of application-specific elements populated with data derived from metadata associated with the one application; and an expanded view for a different application in another portion of the graphical user interface configured to provide principal chrome for a different application; and exposing the bladed view and expanded view via the graphical user interface to facilitate the combined user access to the multiple applications.

Example 2

The computer-implemented method as described in any one or more of the examples in this section, wherein controlling arrangement includes recognizing application-specific customizations indicated by the metadata associated with the one application and populating the application-specific elements using the metadata, the application-specific customizations including one or more of an icon, a color scheme, a title, a content stream, or a background image specified for the one application.

Example 3

The computer-implemented method as described in any one or more of the examples in this section, wherein the bladed view is configured to present dynamically updating content for the one application obtained from operation of the one application in a background state while the bladed view is exposed.

Example 4

The computer-implemented method as described in any one or more of the examples in this section, wherein the bladed view is configured to present dynamically updating content for the one application obtained via a notification system of the platform with the one application in a non-running state.

Example 5

The computer-implemented method as described in any one or more of the examples in this section, wherein the bladed view is available to configure a compact application representation for any displayable application via the platform using corresponding metadata to populate the plurality of application-specific elements.

Example 6

The computer-implemented method as described in any one or more of the examples in this section, wherein the simultask mode is available for any combination of displayable applications supported by the platform.

Example 7

The computer-implemented method as described in any one or more of the examples in this section, wherein the bladed view is configured as a bar placed at a fixed location within the graphical user interface and having a pre-arranged layout of the application-specific elements, such that a consistent compact application representation is created across different applications when the application-specific elements are populated with data for the different applications.

Example 8

The computer-implemented method as described in any one or more of the examples in this section, wherein controlling arrangement of the chrome elements comprises configuring the chrome elements to substantially consume available screen-real estate of a display device used to present the graphical user interface.

Example 9

The computer-implemented method as described in any one or more of the examples in this section, wherein the event comprises user input defined as a trigger for the bladed view applied during interaction with the one application in a single-app mode.

Example 10

The computer-implemented method as described in any one or more of the examples in this section, wherein the event comprises a user selection to identify the one application for the bladed view and a user selection to identify the different application for the expanded view via an application selector accessible via the platform.

Example 11

The computer-implemented method as described in any one or more of the examples in this section, wherein the event comprises a notification event related to the one application received in the background during interaction with the different application in a single-app mode and while the one application is in a non-running state, the notification effective to cause the platform to launch the simultask mode and generate the bladed view for the one application based on the notification.

Example 12

The computer-implemented method as described in any one or more of the examples in this section, wherein the event comprises changing an orientation of the computing device.

Example 13

A computing device adapted to facilitate user access to content associated with multiple applications at the same time thru arrangement of chrome elements for the multiple applications comprising: a processing system; one or more computer-readable media storing processor-executable instructions that, responsive to execution by the processing system, implement an operating system for the computing device configured to perform operations comprising: generating a bladed view of a selected application to provide a compact application representation having a plurality of application-specific elements populated with data derived from metadata associated with the selected application, the operating system configured to generate bladed views for any displayable application of the computing device using corresponding metadata; exposing the bladed view for the selected application in a graphical user interface for the computing device in connection with an expanded view configured to provide principal chrome for a different application; obtaining a notification for the selected application via a notification system of the operating system, the notification indicating an update for data presented via the plurality of application-specific elements the bladed view; and updating the application-specific elements to reflect the update as indicated by the notification.

Example 14

The computing device as described in any one or more of the examples in this section, wherein generating the bladed view comprises: parsing metadata for the selected application; extracting data from the metadata to populate the plurality of application-specific elements; and populating the plurality of application-specific elements with the extracted data.

Example 15

The computing device as described in any one or more of the examples in this section, wherein the operating system is configured to generate bladed views for each displayable application based upon application-specific customizations indicated by metadata for the application when designated or using default information available for the application in the absence of designated application-specific customizations.

Example 16

The computing device as described in any one or more of the examples in this section, wherein the operating system is further configured to perform operations comprising: recognizing input applied in relation to the bladed view to cause expansion of the selected application within the user interface; and responsive to the input, switching views for the selected application and the different application.

Example 17

One or more computer-readable storage media storing instructions that, when executed by a processing system of a device, cause an operating system for the device to perform operations to facilitate user access to content associated with multiple applications at the same time thru arrangement of chrome elements for the multiple applications comprising: exposing an application selector configured to enable user navigation of and selection between multiple applications active on the device; obtaining input via the application selector to select one of the multiple applications to place into a bladed view; arranging a graphical user interface for the device to represent the selected application in the bladed view; receiving additional input via the application selector to select a main application to present in an expanded view; controlling arrangement of the graphical user interface for the device to represent the main application in the expanded view in conjunction with the bladed view of the selected application.

Example 18

The one or more computer-readable storage media as described in any one or more of the examples in this section, wherein the instructions further cause the operating system for the device to perform operations comprising: recognizing input applied in relation to the bladed view to cause expansion of the selected application within the graphical user interface; and responsive to the input, switching views for the selected application and the main application such that the main app is presented in the bladed view in conjunction with the selected application in the expanded view Example 19

The one or more computer-readable storage media as described in any one or more of the examples in this section, wherein the instructions further cause the operating system for the device to perform operations comprising: obtaining a notification for the selected application via a notification system of the operating system, the notification indicating an update for a content stream for the selected application presented via the bladed view; and updating the content stream for the selected application to reflect the update as indicated by the notification Example 20

The one or more computer-readable storage media as described in any one or more of the examples in this section, wherein arranging the graphical user interface for the device to represent the selected application in the bladed view comprises: determining whether application-specific customizations are designated for the selected application by parsing metadata for the selected application; and configuring elements of the bladed view in accordance with the determining by: using application-specific customizations indicated by the metadata to arrange the elements of the bladed view when designated; or using default information available for the selected application to arrange the elements of the bladed view in the absence of designated application-specific customizations.

Conclusion

Although embodiments of techniques and apparatuses enabling adaptive sizing and positioning of application windows have been described in language specific to features and/or methods, it is to be understood that the subject of the appended claims is not necessarily limited to the specific features or methods described. Rather, the specific features and methods are disclosed as example implementations enabling adaptive sizing and positioning of application windows.

What is claimed is:

1. A method implemented by a computing device comprising:
    detecting an event to initiate a simultask mode that enables user access to multiple applications via respective portions of a graphical user interface for the multiple applications;
    responsive to detection of the event, activating the simultask mode by:
        controlling arrangement of the graphical user interface to generate at least:
            a bladed view in a first portion of the graphical user interface for a first application selected by a gesture input in a vertical direction relative to the graphical user interface, the first portion displaying a compact application representation for the first application having a plurality of application-specific elements arranged according to a bladed view template populated with data derived from metadata associated with the first application; and
            an expanded view in a second portion of the graphical user interface for a second application selected by an additional gesture input in a horizontal direction relative to the graphical user interface, the second portion displaying the second application; and
        exposing the bladed view and the expanded view via the graphical user interface to facilitate the user access to the multiple applications.

2. The computer-implemented method as described in claim 1, wherein controlling the arrangement includes recognizing application-specific customizations for the bladed view indicated by the metadata associated with the first application and populating the plurality of application-specific elements using the metadata, the application-specific customizations including one or more of an icon, a color scheme, a title, a content stream, or a background image specified for the first application.

3. The computer-implemented method as described in claim 1, wherein the bladed view is configured to present dynamically updating content for the first application obtained from operation of the first application in a background state while the bladed view is exposed.

4. The computer-implemented method as described in claim 1, wherein the bladed view is configured to present dynamically updating content for the first application obtained via a notification system of the platform with the first application in a non-running state while the bladed view is exposed.

5. The computer-implemented method as described in claim 1, wherein the bladed view template is available to configure a compact application representation for any displayable application using corresponding metadata to populate the plurality of application-specific elements.

6. The computer-implemented method as described in claim 1, wherein the simultask mode is available for any combination of displayable applications.

7. The computer-implemented method as described in claim 1, wherein the bladed view is configured as a bar placed at a fixed location within the graphical user interface and the bladed view template comprises a pre-arranged layout of the plurality of application-specific elements, such that a consistent compact application representation is created across different applications when the plurality of application-specific elements are populated with data for the different applications.

8. The computer-implemented method as described in claim 1, wherein controlling arrangement of the graphical user interface comprises configuring the first portion and the second portion to substantially consume available screen-real estate of a display device used to present the graphical user interface.

9. The computer-implemented method as described in claim 1, wherein the event comprises user input defined as a trigger for the bladed view applied during interaction with the first application in a single-app mode.

10. The computer-implemented method as described in claim 1, wherein the event comprises a user selection to identify the first application for the bladed view and a user selection to identify the second application for the expanded view via an application selector.

11. The computer-implemented method as described in claim 1, wherein the event comprises a notification event related to the first application received in the background during interaction with the second application in a single-app mode and while the first application is in a non-running state, the notification effective to cause the platform to launch the simultask mode and generate the bladed view for the first application based on the notification.

12. The computer-implemented method as described in claim 1, wherein the event comprises changing an orientation of the computing device.

13. A computing device comprising:
a processing system;
one or more computer-readable media storing processor-executable instructions that, responsive to execution by the processing system, implement an operating system for the computing device configured to perform operations comprising:
receiving an input as a gesture in a vertical direction relative to the computing device to select a first application in a graphical user interface;
generating a bladed view of the first application to provide a compact application representation having a plurality of application-specific elements arranged in a bladed view template and populated with data derived from metadata associated with the first application;
exposing the bladed view for the first application in the graphical user interface for the computing device in connection with an expanded view of a second application, the second application selected by an additional input as a gesture in a horizontal direction relative to the computing device to select the second application in the graphical user interface;
obtaining a notification for the first application via a notification system of the operating system, the notification indicating an update for data presented via the plurality of application-specific elements in the bladed view; and
updating the plurality of application-specific elements to reflect the update as indicated by the notification.

14. The computing device as described in claim 13, wherein generating the bladed view comprises:
parsing metadata for the first application;
extracting data from the metadata to populate the plurality of application-specific elements; and
populating the plurality of application-specific elements with the extracted data.

15. The computing device as described in claim 13, wherein the operating system is configured to generate bladed views for each displayable application based upon application-specific customizations indicated by metadata for the respective displayable application to populate the bladed view template when designated or using default information available for the respective displayable application to populate the bladed view template in the absence of designated application-specific customizations.

16. The computing device as described in claim 13, wherein the operating system is further configured to perform operations comprising:
recognizing input applied in relation to the bladed view to cause expansion of the first application within the user interface; and
responsive to the input, switching views for the first application and the second application.

17. One or more computer-readable storage media storing instructions that, when executed by a processing system of a device, cause an operating system for the device to perform operations comprising:
exposing an application selector configured to enable user navigation of and selection between multiple applications active on the device;
obtaining input via the application selector to select one of the multiple applications to place into a bladed view, the input comprises a gesture in a vertical direction on the application selector;
arranging a graphical user interface for the device to represent the selected application in a bladed view template as the bladed view;
receiving additional input via the application selector to select a main application to present in an expanded view, the additional input comprises another gesture in a horizontal direction on the application selector;
controlling arrangement of the graphical user interface for the device to represent the main application in the expanded view in conjunction with the bladed view of the selected application.

18. The one or more computer-readable storage media as described in claim 17, wherein the instructions further cause the operating system for the device to perform operations comprising:
    recognizing input applied in relation to the bladed view to cause expansion of the selected application within the graphical user interface; and
    responsive to the input, switching views for the selected application and the main application such that the main application is presented in the bladed view in conjunction with the selected application in the expanded view.

19. The one or more computer-readable storage media as described in claim 17, wherein the instructions further cause the operating system for the device to perform operations comprising:
    obtaining a notification for the selected application via a notification system of the operating system, the notification indicating an update for a content stream for the selected application presented via the bladed view; and
    updating the content stream for the selected application to reflect the update as indicated by the notification.

20. The one or more computer-readable storage media as described in claim 17, wherein arranging the graphical user interface for the device to represent the selected application in the bladed view comprises:
    determining whether application-specific customizations are designated for the selected application by parsing metadata for the selected application; and
    configuring the bladed view template in accordance with the determining by:
        using application-specific customizations indicated by the metadata to arrange elements in the bladed view when designated; or
        using default information available for the selected application to arrange the elements in the bladed view template in the absence of designated application-specific customizations.

* * * * *